US012676436B2

(12) United States Patent
Nakamura

(10) Patent No.: US 12,676,436 B2
(45) Date of Patent: Jul. 7, 2026

(54) CONNECTOR CONNECTED TO A SHEET TYPE CONNECTION OBJECT HAVING CONDUCTOR EXPOSED ON AT LEAST ONE SURFACE OF THE THEREOF

(71) Applicant: Japan Aviation Electronics Industry, Limited, Tokyo (JP)

(72) Inventor: Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 359 days.

(21) Appl. No.: 18/443,142

(22) Filed: Feb. 15, 2024

(65) Prior Publication Data

US 2024/0380148 A1 Nov. 14, 2024

(30) Foreign Application Priority Data

May 11, 2023 (JP) ................................ 2023-078366

(51) Int. Cl.
*H01R 13/05* (2006.01)
*H01R 12/77* (2011.01)
*H01R 13/502* (2006.01)

(52) U.S. Cl.
CPC ......... *H01R 13/052* (2013.01); *H01R 12/777* (2013.01); *H01R 13/502* (2013.01)

(58) Field of Classification Search
CPC ... H01R 13/052; H01R 12/777; H01R 13/502
USPC .......................................................... 439/345
See application file for complete search history.

(56) References Cited

U.S. PATENT DOCUMENTS

| | | | | |
|---|---|---|---|---|
| 10,630,004 B2 * | 4/2020 | Hashiguchi | ............ | H01R 12/79 |
| 11,205,870 B2 * | 12/2021 | Matsuo | .................. | H01R 12/69 |
| 12,424,774 B2 * | 9/2025 | Hashiguchi | .......... | H01R 12/774 |
| 12,456,830 B2 * | 10/2025 | Matsuo | ................ | H01R 12/774 |
| 2018/0233854 A1 | 8/2018 | Komoto et al. | | |
| 2018/0269606 A1 * | 9/2018 | Nakamura | ............. | H01R 12/68 |
| 2021/0075135 A1 * | 3/2021 | Komoto | ................. | H01R 12/59 |
| 2021/0098898 A1 * | 4/2021 | Komoto | ................. | H01R 43/20 |
| 2021/0104824 A1 * | 4/2021 | Hashiguchi | .............. | A44C 5/14 |
| 2023/0420902 A1 * | 12/2023 | Kimura | ................ | H01R 12/592 |
| 2024/0178602 A1 * | 5/2024 | Nakamura | ........... | H01R 12/592 |
| 2025/0055216 A1 * | 2/2025 | Matsuo | ................ | H01R 13/052 |

FOREIGN PATENT DOCUMENTS

JP 2018129244 A 8/2018

* cited by examiner

*Primary Examiner* — Harshad C Patel
(74) *Attorney, Agent, or Firm* — MUNCY, GEISSLER, OLDS & LOWE, P.C.

(57) ABSTRACT

A connector includes a plug contact having conductivity, an inner contact having conductivity and being supported while having part of the inner contact inserted in a recessed portion of the plug contact, and a housing retaining the plug contact, the inner contact having a first contacting portion that makes contact with an inner surface of the recessed portion of the plug contact, a second contacting portion that makes contact with the inner surface of the recessed portion on an opposite side from the first contacting portion across a fitting axis, a third contacting portion that faces a flange of the plug contact, and a restricted portion that makes contact with a restriction portion of the housing at a position closer to a base end of the recessed portion than the second contacting portion is.

10 Claims, 19 Drawing Sheets

CONNECTOR CONNECTED TO A SHEET TYPE CONNECTION OBJECT HAVING CONDUCTOR EXPOSED ON AT LEAST ONE SURFACE OF THE THEREOF

BACKGROUND OF THE INVENTION

The present invention relates to a connector, particularly to a connector that is connected to a sheet type connection object having a conductor exposed on at least one surface of the connection object.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a conductor drawn from the electrode.

As a connector of this type, for example, JP 2018-129244 A discloses a connector as shown in FIG. 39. This connector includes a housing 2 and a base member 3 that are separately disposed on opposite sides of a flexible substrate 1 to sandwich the flexible substrate 1. Tubular portions 4A of contacts 4 are passed through contact through-holes 2A of the housing 2, and flanges 4B of the contacts 4 are sandwiched between the housing 2 and conductors 1A exposed on the top surface of the flexible substrate 1.

In this state, by pushing the base member 3 toward the housing 2, as shown in FIG. 40, a projection 3A of the base member 3 is inserted into a projection accommodating portion 4C of the contact 4 with the flexible substrate 1 being sandwiched therebetween, and an inner surface of the projection accommodating portion 4C makes contact with the conductor 1A with a predetermined contact force, whereby the contact 4 is electrically connected to the conductor 1A.

Further, housing fixing posts 3B formed to project from the base member 3 are press-fitted into post accommodating portions 2B of the housing 2 as shown in FIG. 39, so that the housing 2 and the base member 3 are fixed to each other.

When a wearable device is fitted with the connector disclosed in JP 2018-129244 A, the wearable device can be connected to an electrode formed of a conductor.

However, when the conductor 1A is exposed on the bottom surface of the flexible substrate 1, the connector of JP 2018-129244A is useless for electrically connecting the conductor 1A to the contact 4, disadvantageously.

SUMMARY OF THE INVENTION

The present invention has been made to solve the foregoing problem and aims at providing a connector that enables an electrical connection of a contact to a conductor of a connection object regardless of whether the conductor is exposed on the top surface or the bottom surface of the connection object.

A connector according to the present invention comprises:

a plug contact having conductivity and including a tubular portion and a flange, the tubular portion extending along a fitting axis and being provided in its interior with a recessed portion, and the flange extending from a base end of the tubular portion in a direction orthogonal to the fitting axis;

an inner contact having conductivity and being supported while having part of the inner contact inserted in the recessed portion; and a housing retaining the plug contact, wherein the housing includes a restriction portion that is disposed in the recessed portion of the plug contact and is configured to restrict rotation of the inner contact, the inner contact includes

- a first contacting portion that makes contact with an inner surface of the recessed portion to be electrically connected to the plug contact,
- a second contacting portion that makes contact with the inner surface of the recessed portion on an opposite side from the first contacting portion across the fitting axis and at a position closer to the base end of the recessed portion than the first contacting portion is,
- a third contacting portion extending in a direction orthogonal to the fitting axis and facing the flange, and
- a restricted portion that faces in an opposite direction from the second contacting portion and makes contact with the restriction portion at a position closer to the base end of the recessed portion than the second contacting portion is, and part of a connection object of sheet shape having a conductor exposed on at least one surface of the connection object is sandwiched between a bottom surface of the flange of the plug contact and the third contacting portion of the inner contact in a direction along the fitting axis, the bottom surface of the flange makes contact with a top surface of the connection object, and the third contacting portion makes contact with a bottom surface of the connection object, whereby the plug contact is electrically connected to the conductor directly when the conductor is exposed on the top surface of the connection object, and the plug contact is electrically connected to the conductor via the inner contact when the conductor is exposed on the bottom surface of the connection object.

DETAILED DESCRIPTION OF THE INVENTION

Embodiments of the present invention are described below based on the accompanying drawings.

Embodiment 1

Figure 1:
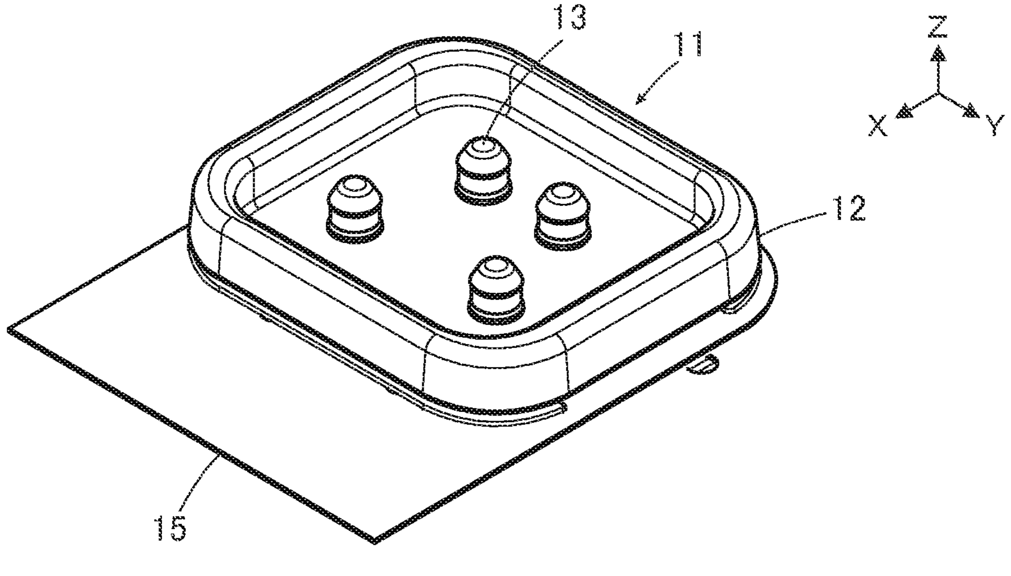
FIG. 1 is a perspective view showing a connector according to Embodiment 1 connected to a connection object.

FIG. 1 shows a connector 11 according to Embodiment 1. The connector 11 is used as, for instance, a garment-side connector for fitting a wearable device and has a housing 12 made of an insulating material. Four plug contacts 13 are retained in the housing 12, and, in addition, a sheet type conductive member 15 is retained by the housing 12. The sheet type conductive member 15 constitutes a sheet type connection object to which the connector 11 is connected.

The four plug contacts 13 are arranged in two rows parallel to each other and disposed to project perpendicularly to the sheet type conductive member 15.

For convenience, the sheet type conductive member 15 is defined as extending in an XY plane, the arrangement direction of the four plug contacts 13 is referred to as "Y direction," and the direction in which the four plug contacts 13 project is referred to as "+Z direction." The Z direction is a fitting direction in which the connector 11 is fitted to a counter connector.

Figure 2:
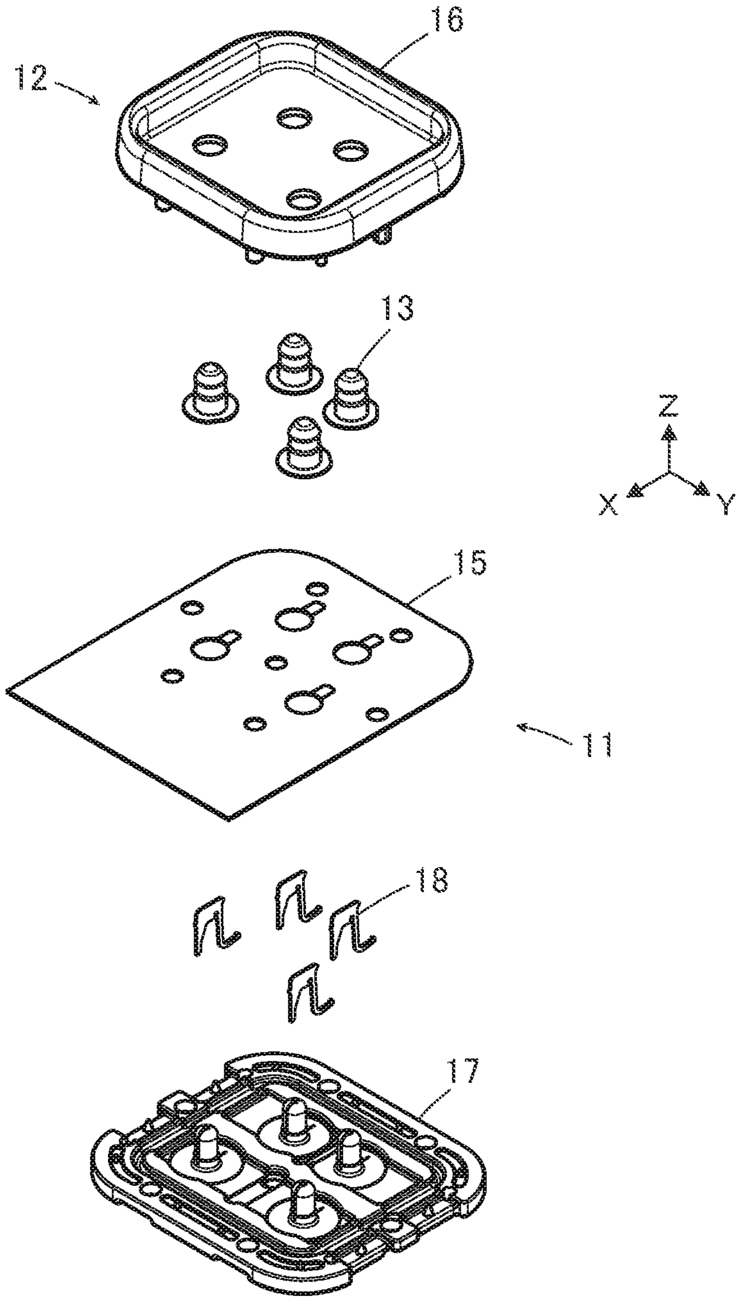
FIG. 2 is an exploded perspective view of the connector according to Embodiment 1.

FIG. 2 shows an exploded perspective view of the connector 11. The connector 11 includes a top insulator 16 and a bottom insulator 17, and these top and bottom insulators 16 and 17 constitute the housing 12.

The four plug contacts 13 are disposed on the −Z direction side of the top insulator 16, and the sheet type conductive member 15 is disposed on the −Z direction side of the four plug contacts 13. Further, four inner contacts 18 are disposed on the −Z direction side of the sheet type conductive member 15, and the bottom insulator 17 is disposed on the −Z direction side of the four inner contacts 18. The four inner contacts 18 separately correspond to the four plug contacts 13.

Figure 3:
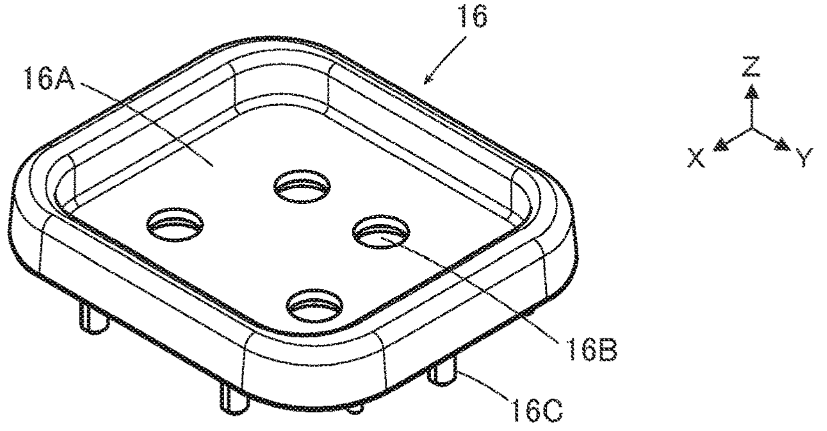
FIG. 3 is a perspective view showing a top insulator used in the connector of Embodiment 1.

As shown in FIG. 3, the top insulator 16 includes a recessed portion 16A opening in the +Z direction, and four contact through-holes 16B formed within the recessed portion 16A. The recessed portion 16A constitutes a counter connector accommodating portion in which part of a counter connector (not shown) is to be accommodated, and the four contact through-holes 16B separately correspond to the four plug contacts 13. In addition, on a surface, facing in the −Z direction, of the top insulator 16, a plurality of bosses 16C are formed to project in the −Z direction.

Figure 4:
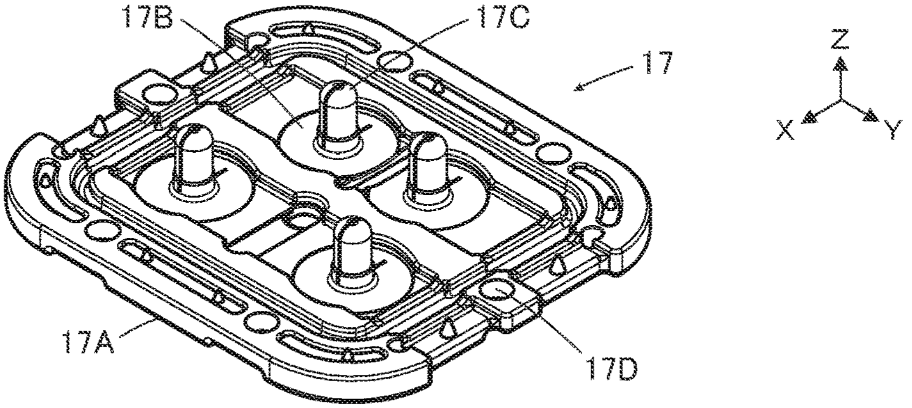
FIG. 4 is a perspective view showing a bottom insulator used in the connector of Embodiment 1.

As shown in FIG. 4, the bottom insulator 17 includes a flat plate portion 17A, and four contact arrangement regions 17B are defined on a top surface, facing in the +Z direction, of the flat plate portion 17A. Each contact arrangement region 17B is a circular region at which the corresponding plug contact 13 is arranged via the sheet type conductive member 15. The four contact arrangement regions 17B are separately provided with four projections 17C projecting in the +Z direction from respectively center parts of the contact arrangement regions 17B.

In addition, the flat plate portion 17A is provided with a plurality of through-holes 17D separately corresponding to the plurality of bosses 16C of the top insulator 16.

Figure 5:
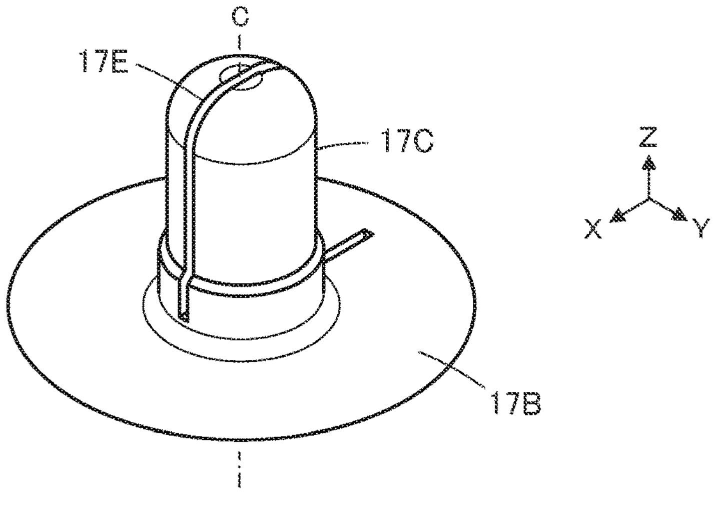
FIG. 5 is a perspective view showing a projection formed in the bottom insulator in Embodiment 1.
Figure 6:
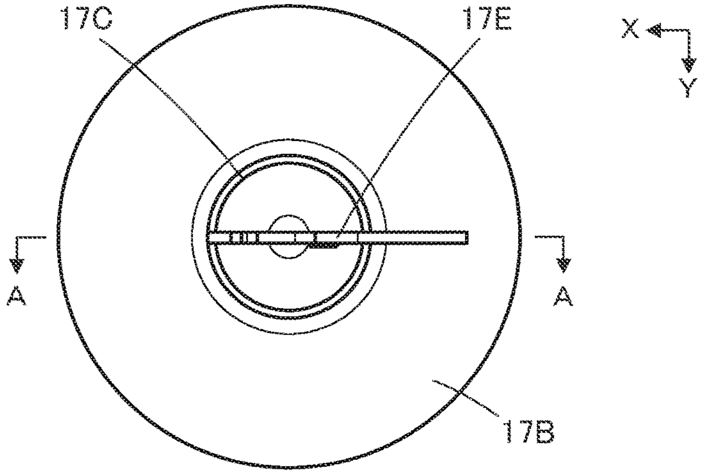
FIG. 6 is a plan view showing the projection formed in the bottom insulator in Embodiment 1.

As shown in FIGS. 5 and 6, each projection 17C formed in the contact arrangement region 17B of the bottom insulator 17 has a substantially columnar shape extending in the Z direction along a fitting axis C of the plug contact 13 disposed correspondingly to the contact arrangement region 17B, and an inner contact accommodating groove 17E is formed in the projection 17C and in the contact arrangement region 17B on the −X direction side of the projection 17C.

The inner contact accommodating groove 17E is provided to accommodate the corresponding inner contact 18, passes the fitting axis C and extends along an XZ plane. The inner contact accommodating groove 17E penetrates a +Z directional portion of the projection 17C in the X direction and extends from a root part of the projection 17C to the contact arrangement region 17B as shown in FIG. 7.

Figure 8:
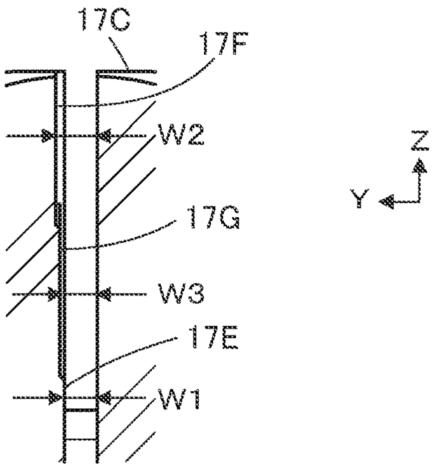
FIG. 8 is a partial cross-sectional view showing an inner contact accommodating groove of the projection formed in the bottom insulator in Embodiment 1.

In addition, the inner contact accommodating groove 17E includes: a first accommodating groove 17F formed at a +Z directional end portion, which serves as an opening end portion, of the inner contact accommodating groove 17E; and a second accommodating groove 17G disposed at an inner part on the −Z direction side of the first accommodating groove 17F and communicating with the first accommodating groove 17F. These first and second accommodating grooves 17F and 17G have different groove widths. That is, as shown in FIG. 8, as compared to a Y directional groove width W1 of the other part of the inner contact accommodating groove 17E than the first accommodating groove 17F and the second accommodating groove 17G, the first accommodating groove 17F has a first groove width W2 wider than the groove width W1, while the second accommodating groove 17G has a second groove width W3 wider than the groove width W1 and narrower than the first groove width W2.

Figure 7:
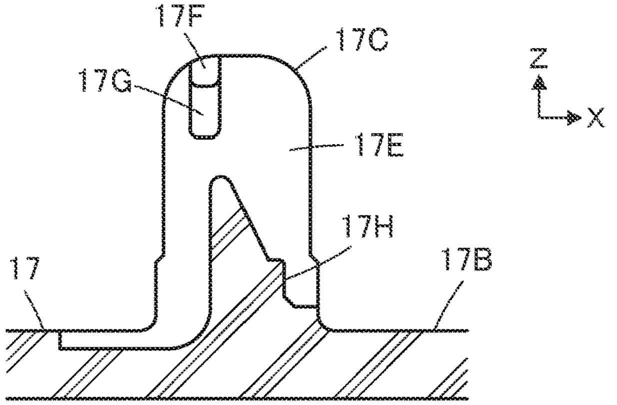
FIG. 7 is a cross-sectional view taken along line A-A in FIG. 6.

Further, as shown in FIG. 7, the projection 17C has a restriction portion 17H disposed inside the inner contact accommodating groove 17E and formed from a surface facing in the +X direction.

The four plug contacts 13 are each made of a conductive material such as metal, and are to be connected to corresponding contacts of a counter connector (not shown) when part of the counter connector is accommodated in the recessed portion 16A of the top insulator 16.

Figure 9:
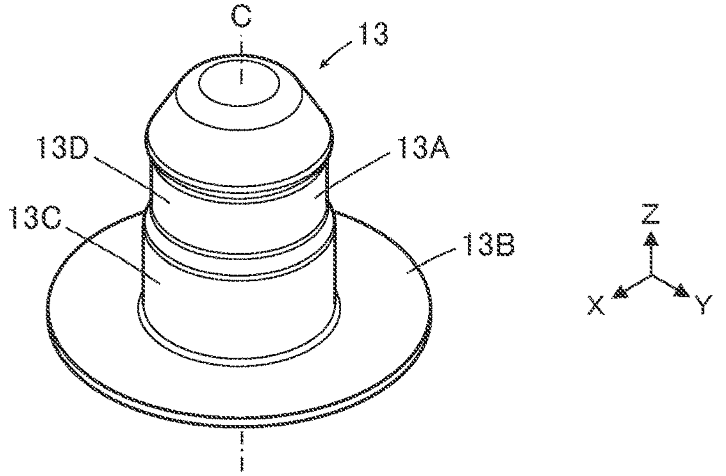
FIG. 9 is a perspective view showing a plug contact used in the connector of Embodiment 1.

As shown in FIG. 9, the plug contact 13 has a tubular portion 13A of cylindrical shape extending in the Z direction along the fitting axis C, and a flange 13B of flat plate shape extending from a −Z directional end portion of the tubular portion 13A along an XY plane. The tubular portion 13A includes a large diameter portion 13C situated on the −Z direction side and a small diameter portion 13D concentrically connected to the large diameter portion 13C on the +Z direction side of the large diameter portion 13C.

Figure 10:
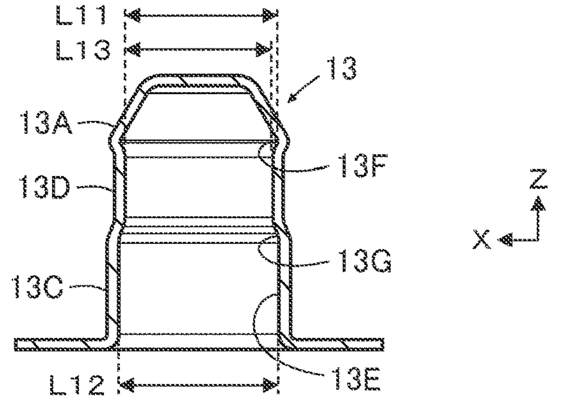
FIG. 10 is a cross-sectional view showing the plug contact used in the connector of Embodiment 1.

As shown in FIG. 10, the tubular portion 13A is provided in its interior with a recessed portion 13E opening in the −Z direction, and a receiving portion 13F is formed of a dent annularly extending along an XY plane in an inner surface of the recessed portion 13E at a +Z directional end portion of the small diameter portion 13D. In addition, a step portion 13G annularly extending along an XY plane is formed in the inner surface of the recessed portion 13E at a boundary portion between the large diameter portion 13C and the small diameter portion 13D.

A distance L11 in the X direction from the receiving portion 13F to a part of an inner surface of the small diameter portion 13D which part faces the receiving portion 13F has a value smaller than an inside diameter L12 of the large diameter portion 13C and larger than an inside diameter L13 of the small diameter portion 13D.

The fitting axis C is an axis passing the center of the tubular portion 13A and extending in the Z direction that is the fitting direction between the connector 11 and a counter connector.

While the tubular portion 13A has a cylindrical shape, the cross-sectional shape thereof is not limited to a circular shape, and the tubular portion 13A may have various cross-sectional shapes such as an elliptical shape and a polygonal shape as long as the tubular portion 13A is provided in its interior with the recessed portion 13E.

Any of the four plug contacts 13 may be each used as a terminal for transmitting an electric signal.

The sheet type conductive member 15 has a multilayer structure in which a plurality of wiring layers each formed from a conductor and a plurality of insulating layers are laminated.

Figure 11:
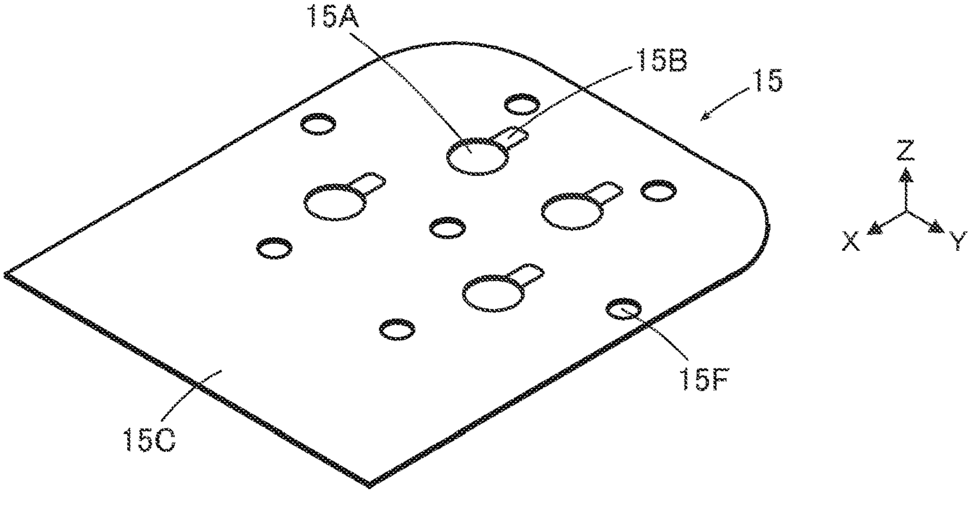
FIG. 11 is a perspective view of a connection object to be connected to the connector of Embodiment 1, as viewed from an obliquely upper position.

As shown in FIG. 11, the sheet type conductive member 15 is provided with four circular opening portions 15A penetrating the sheet type conductive member 15 in the Z direction. The four opening portions 15A separately correspond to the four plug contacts 13. On a top surface, facing in the +Z direction, of the sheet type conductive member 15, a wiring layer 15B is exposed toward the +Z direction at parts separately adjacent to the opening portions 15A on the −X direction side of the opening portions 15A, while an insulating layer 15C is exposed in a region excluding the four opening portions 15A and the four parts of the wiring layer 15B adjacent to these opening portions 15A.

Figure 12:
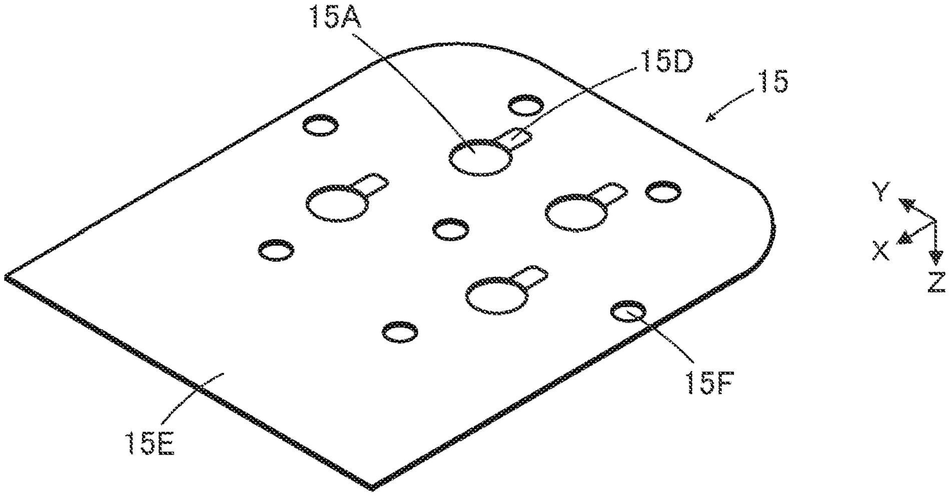
FIG. 12 is a perspective view of the connection object to be connected to the connector of Embodiment 1, as viewed from an obliquely lower position.

Since the opening portions 15A penetrate the sheet type conductive member 15 in the Z direction, as shown in FIG. 12, the four opening portions 15A can be seen also on a bottom surface, facing in the −Z direction, of the sheet type conductive member 15.

On the bottom surface, facing in the −Z direction, of the sheet type conductive member 15, a wiring layer 15D is exposed toward the −Z direction at parts separately adjacent to the four opening portions 15A on the −X direction side of the opening portions 15A, while an insulating layer 15E is exposed in a region excluding the four opening portions 15A and the four parts of the wiring layer 15D adjacent to these opening portions 15A.

In addition, as shown in FIGS. 11 and 12, a plurality of through-holes 15F separately corresponding to the plurality of bosses 16C of the top insulator 16 are formed at a peripheral portion of the sheet type conductive member 15.

Figure 13:
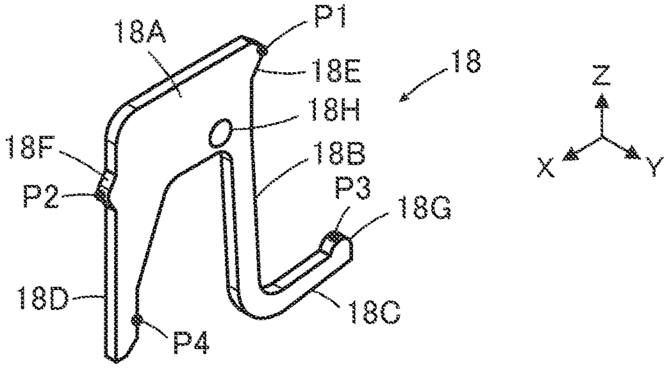
FIG. 13 is a perspective view showing an inner contact used in the connector of Embodiment 1.
Figure 14:
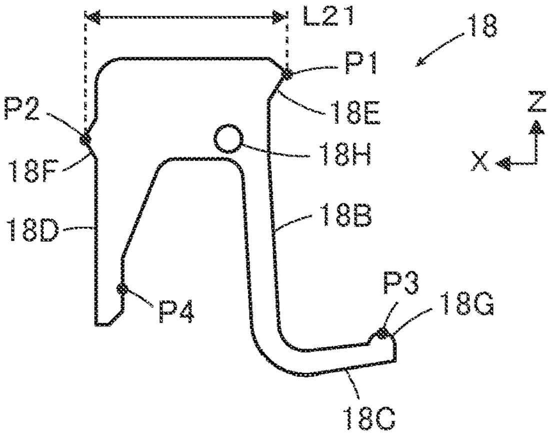
FIG. 14 is a front view showing the inner contact used in the connector of Embodiment 1.

As shown in FIGS. 13 and 14, the inner contact 18 is formed of a metal sheet of flat plate shape that is cut in a predetermined shape and has conductivity, and has a flat plate portion 18A extending along an XZ plane. A first extending portion 18B extends in the −Z direction from a −X directional end portion of the flat plate portion 18A, an arm portion 18C extends in the −X direction from a −Z directional end portion of the first extending portion 18B, and a second extending portion 18D extends in the −Z direction from a +X directional end portion of the flat plate portion 18A. The flat plate portion 18A, the first extending portion 18B, and the second extending portion 18D are inserted into the recessed portion 13E of the corresponding plug contact 13 when the connector 11 is assembled.

A hook portion 18E is formed at the −X directional and +Z directional end portion of the flat plate portion 18A to project in the −X direction. The hook portion 18E projects in a right angle shape or a chevron shape toward the −X direction, and a first contacting portion P1 facing in the −Z direction is set at a −X directional end portion of the hook portion 18E.

A protruding portion 18F protruding in a convex shape in the +X direction is formed at the +X directional end portion of the flat plate portion 18A on the −Z direction side from the first contacting portion P1, and a second contacting portion P2 facing in the +X direction is set on a +X directional end portion of the protruding portion 18F.

A distance L21 in the X direction between the first contacting portion P1 and the second contacting portion P2 is slightly larger than the distance L11 in the X direction from the receiving portion 13D to a part of the inner surface of the small diameter portion 13D which part faces the receiving portion 13D, is smaller than the inside diameter L12 of the large diameter portion 13C, and is larger than the inside diameter L13 of the small diameter portion 13D in the plug contact 13 shown in FIG. 10.

In addition, a protruding portion 18G protruding in a convex shape toward the +Z direction is formed at a −X directional end portion of the arm portion 18C, and a third contacting portion P3 facing in the +Z direction is set on a +Z directional end portion of the protruding portion 18G.

A restricted portion P4 facing in the −X direction is set on a lateral surface of a −Z directional end portion of the second extending portion 18D facing the first extending portion 18B.

Further, a press-fitting portion 18H of convex shape is formed on a surface, facing in the +Y direction, of the flat plate portion 18A to protrude in the +Y direction. The press-fitting portion 18H is formed by, for example, exerting a pressing force on the flat plate portion 18A from the −Y direction and deforming the flat plate portion 18A.

Figure 15:
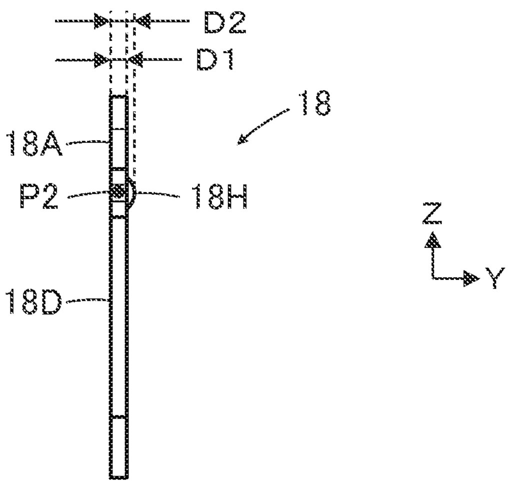
FIG. 15 is a side view showing the inner contact used in the connector of Embodiment 1.

Due to the presence of the press-fitting portion 18H as above, as shown in FIG. 15, a thickness D2 of the inner contact 18 at a part where the press-fitting portion 18H is formed is larger than a thickness D1 of the inner contact 18 at a part where the press-fitting portion 18H is not formed.

In addition, the press-fitting portion 18H is formed at an X directional position corresponding to the first accommodating groove 17F and the second accommodating groove 17G of the projection 17C of the bottom insulator 17 shown in FIG. 7.

It is configured such that the groove width W1 of the inner contact accommodating groove 17E of the projection 17C of the bottom insulator 17 shown in FIG. 8 is slightly larger than the thickness D1 of the inner contact 18 at the part where the press-fitting portion 18H is not formed, the first groove width W2 of the first accommodating groove 17F is substantially equal to the thickness D2 of the inner contact 18 at the part where the press-fitting portion 18H is formed, and the second groove width W3 of the second accommodating groove 17G is smaller than the thickness D2 of the inner contact 18 at the part where the press-fitting portion 18H is formed.

The four contact through-holes 16B of the top insulator 16, the four plug contacts 13, the four opening portions 15A of the sheet type conductive member 15, the four inner contacts 18, and the four contact arrangement regions 17B of the bottom insulator 17 are arranged so as to align with each other in the Z direction.

In addition, the bosses 16C of the top insulator 16, the through-holes 15F of the sheet type conductive member 15, and the through-holes 17D of the bottom insulator 17 are arranged so as to align with each other in the Z direction.

Figure 16:
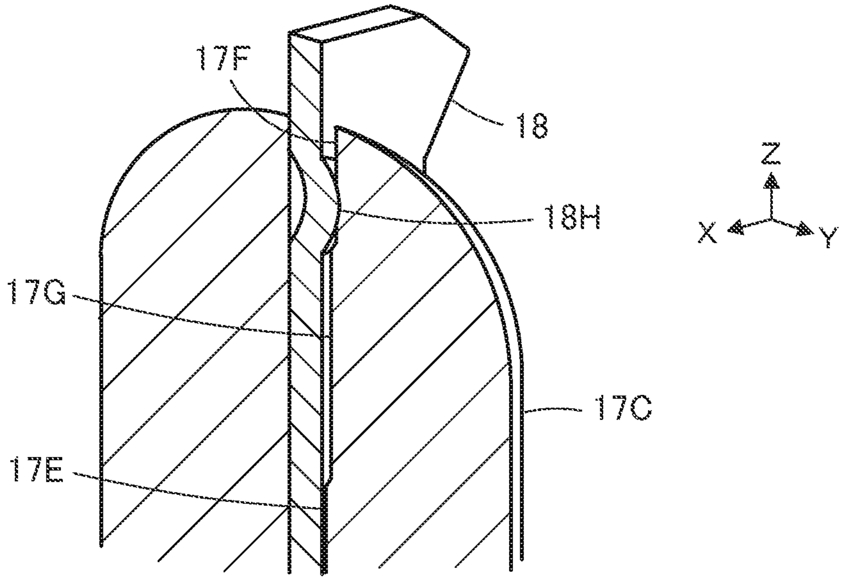
FIG. 16 is a partially broken perspective view showing the inner contact to be inserted in the inner contact accommodating groove of the connector of Embodiment 1 at the start of assembling.

When the connector 11 is assembled, first, the four inner contacts 18 are separately retained in the inner contact accommodating grooves 17E of the four projections 17C of the bottom insulator 17. Since the first accommodating groove 17F formed at the +Z directional end portion of the inner contact accommodating groove 17E of the projection 17C has the first groove width W2 substantially equal to the thickness D2 of the inner contact 18 at the part where the press-fitting portion 18H is formed, as shown in FIG. 16, each inner contact 18 is retained in a state where the press-fitting portion 18H is inserted into the first accommodating groove 17F of the corresponding projection 17C from the +Z direction and is situated at the boundary portion between the first accommodating groove 17F and the second accommodating groove 17G.

Figure 17:
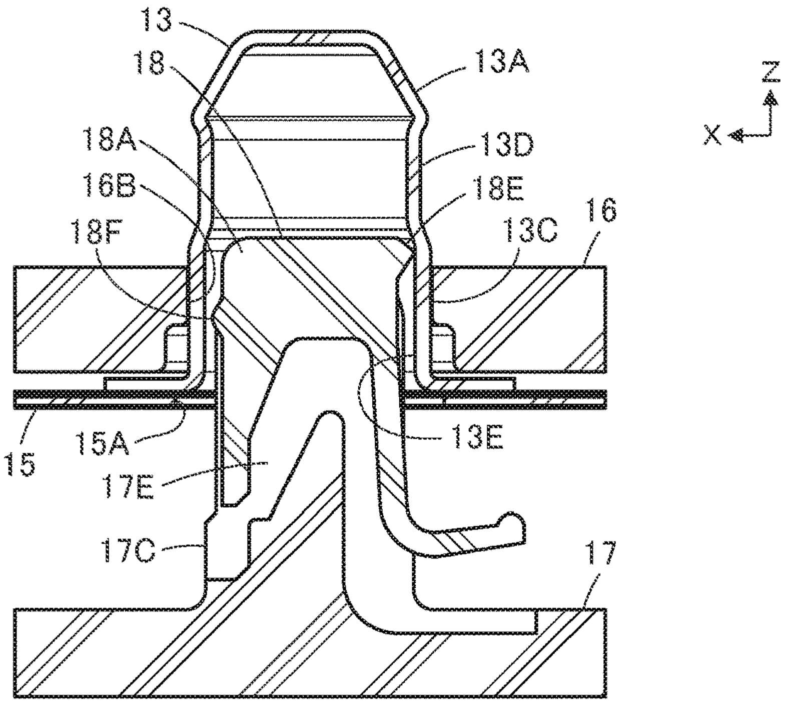
FIG. 17 is a cross-sectional view showing the connector of Embodiment 1 at the start of assembling.

Subsequently, as shown in FIG. 17, the tubular portion 13A of each plug contact 13 is inserted into the corresponding one of the four contact through-holes 16B of the top insulator 16 from the −Z direction, and the bottom insulator 17 is pressed toward the top insulator 16 in the +Z direction with the sheet type conductive member 15 being sandwiched therebetween.

At this time, the inner contact 18 retained by the inner contact accommodating groove 17E of the projection 17C of the bottom insulator 17 is pushed up in the +Z direction along with the bottom insulator 17, and the flat plate portion 18A of the inner contact 18 is inserted into the recessed portion 13E of the corresponding plug contact 13 through the opening portion 15A of the sheet type conductive member 15.

Here, the distance L21 in the X direction between the −X directional end portion of the hook portion 18E and the +X directional end portion of the protruding portion 18F of the inner contact 18 shown in FIG. 14 is smaller than the inside diameter L12 of the large diameter portion 13C and larger than the inside diameter L13 of the small diameter portion 13D of the plug contact 13. Therefore, while the flat plate portion 18A of the inner contact 18 can move in the +Z direction within the large diameter portion 13C of the plug contact 13, the protruding portion 18F situated on the −Z direction side from the hook portion 18E cannot enter the small diameter portion 13D and is hooked by the step portion 13G situated at the boundary portion between the large diameter portion 13C and the small diameter portion 13D as shown in FIG. 18.

Figure 18:
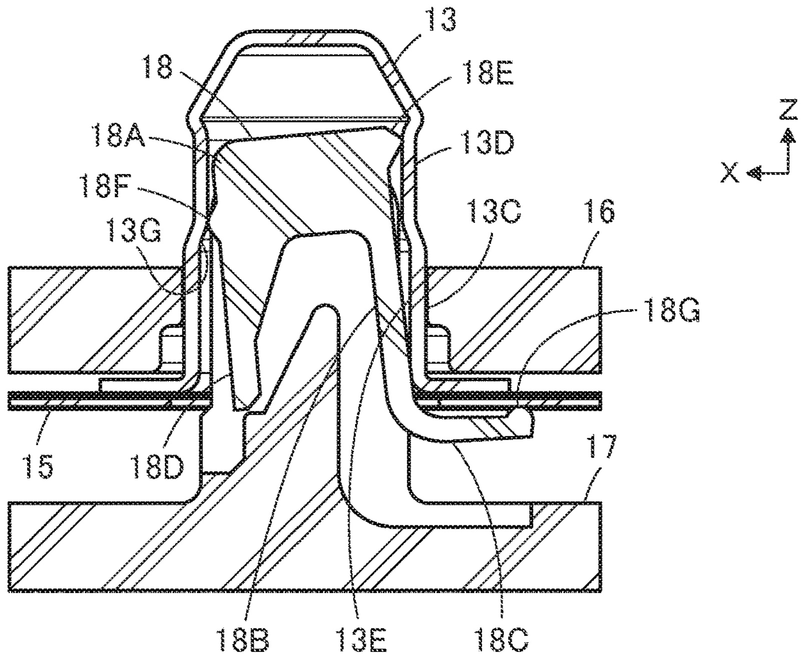
FIG. 18 is a cross-sectional view showing the connector of Embodiment 1 in the process of assembling.

As a result, the inner contact 18 takes a position rotated counterclockwise by a predetermined angle in FIG. 18 and moves in the +Z direction within the recessed portion 13E of the plug contact 13.

Accordingly, the first extending portion 18B and the second extending portion 18D of the inner contact 18 are also inserted into the recessed portion 13E of the plug contact 13, and further, the protruding portion 18G formed at the −X directional end portion of the arm portion 18C extending in the −X direction from the −Z directional end portion of the first extending portion 18B makes contact with the bottom surface on the −Z direction side of the sheet type conductive member 15.

Figure 19:
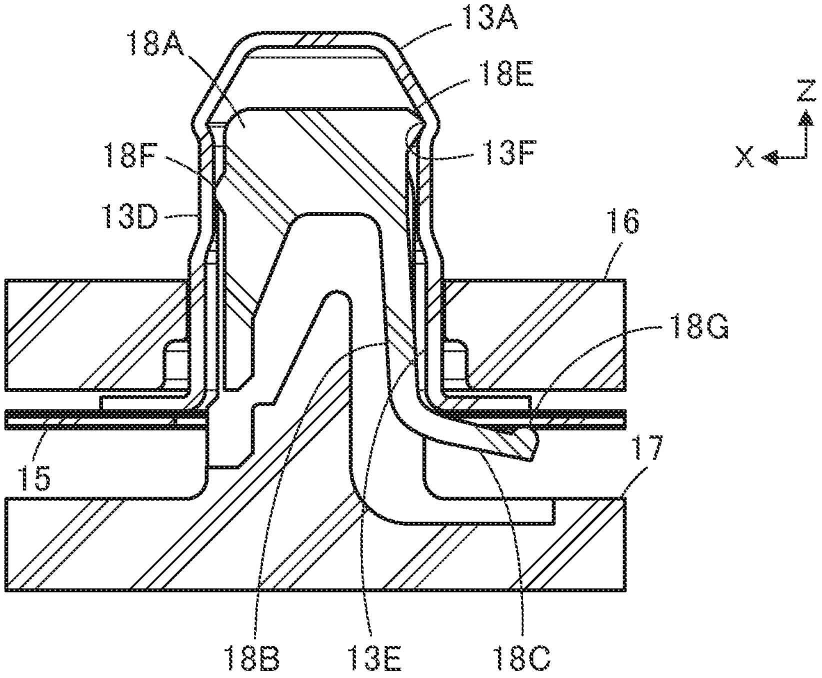
FIG. 19 is another cross-sectional view showing the connector of Embodiment 1 in the process of assembling.

When the bottom insulator 17 is further pressed in the +Z direction in this state, the flat plate portion 18A moves in the +Z direction while the first extending portion 18B and the arm portion 18C of the inner contact 18 are elastically deformed, and as shown in FIG. 19, the hook portion 18E is received by the receiving portion 13F formed in the recessed portion 13E of the plug contact 13.

Consequently, the inner contact 18 is rotated clockwise in FIG. 19 and retained by the plug contact 13 in a state where the protruding portion 18G of the arm portion 18C is pressed in the −Z direction from the sheet type conductive member 15, and the protruding portion 18F of the flat plate portion 18A is pressed in the −X direction from the inner surface of the small diameter portion 13D of the plug contact 13.

Figure 20:
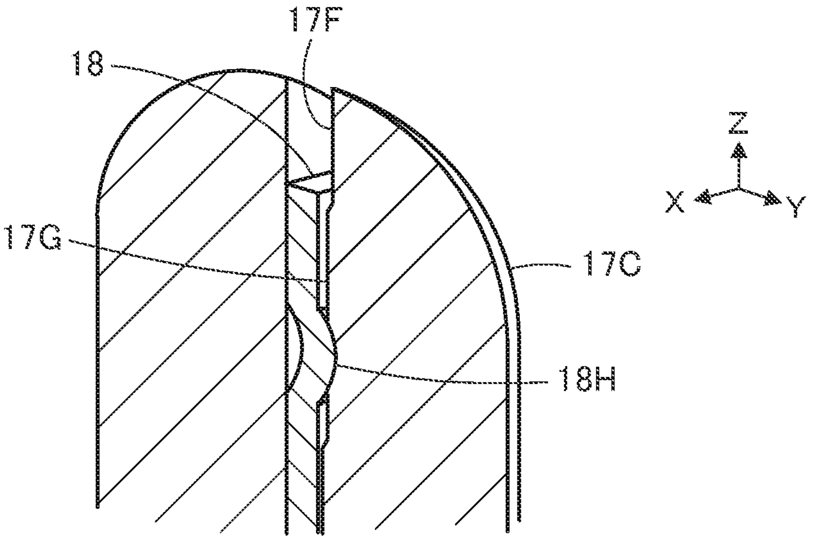
FIG. 20 is a partially broken perspective view showing the inner contact accommodated in the inner contact accommodating groove of the connector of Embodiment 1 in the process of assembling.

Further, when the bottom insulator 17 is pressed in the +Z direction toward the top insulator 16, since the inner contact 18 is retained by the plug contact 13, the projection 17C of the bottom insulator 17 moves in the +Z direction relatively to the inner contact 18, and as shown in FIG. 20, the press-fitting portion 18H of the inner contact 18 is inserted into the second accommodating groove 17G from the first accommodating groove 17F of the corresponding projection 17C.

Here, since the second groove width W3 of the second accommodating groove 17G of the projection 17C shown in FIG. 8 has the second groove width W3 narrower than the thickness D2 of the inner contact 18 at the part where the press-fitting portion 18H is formed, the press-fitting portion 18H is press-fitted in the second accommodating groove 17G of the projection 17C, and the inner contact 18 is thus retained by the projection 17C of the bottom insulator 17.

Figure 21:
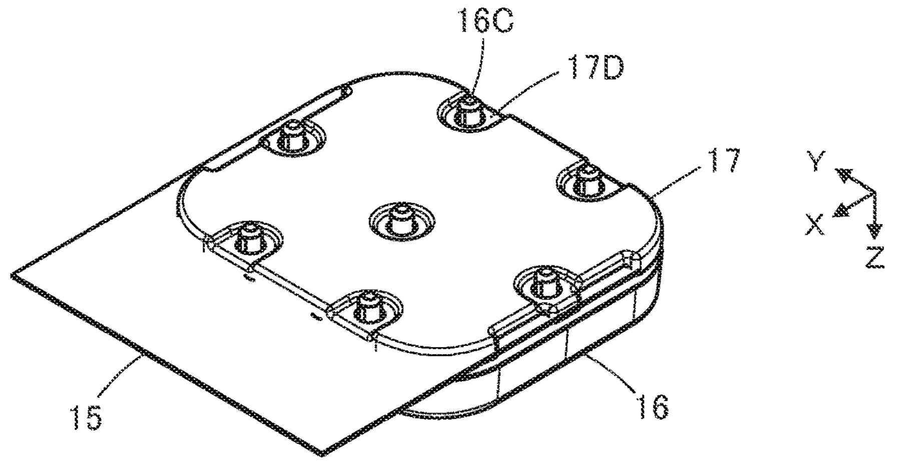
FIG. 21 is a perspective view of the connector of Embodiment 1 in the process of assembling, as viewed from an obliquely lower position.

In addition, by pressing the bottom insulator 17 against the top insulator 16, the bosses 16C of the top insulator 16 sequentially penetrate the through-holes 15F of the sheet type conductive member 15, and the through-holes 17D of the bottom insulator 17. Thereafter, as shown in FIG. 21, the top insulator 16 and the bottom insulator 17 are fixed to each other through heat deformation of a tip of each of the plurality of bosses 16C projecting on the −Z direction side of the bottom insulator 17. Thus, the assembling operation of the connector 11 is completed.

Figure 22:
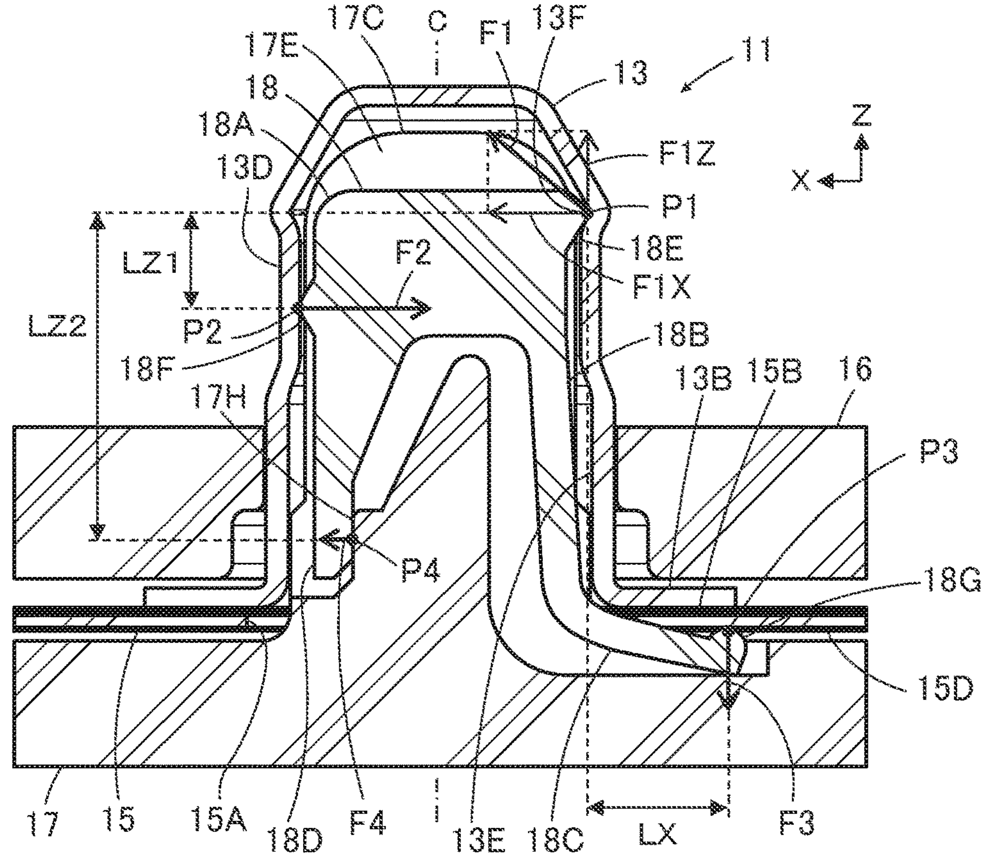
FIG. 22 is a cross-sectional view showing the connector of Embodiment 1 connected to the connection object.

In the connector 11 assembled as above, as shown in FIG. 22, the restricted portion P4 set at the −Z directional end portion of the second extending portion 18D of the inner contact 18 makes contact with the restriction portion 17H formed inside the inner contact accommodating groove 17E of the projection 17C of the bottom insulator 17, whereby counterclockwise rotation of the inner contact 18 in FIG. 22 is restricted.

In addition, the flange 13B of the plug contact 13 is situated around the corresponding opening portion 15A of the sheet type conductive member 15, and the sheet type conductive member 15 is sandwiched between the protruding portion 18G formed at the −X directional end portion of the arm portion 18C of the inner contact 18 and a bottom surface on the −Z direction side of the flange 13B of the plug contact 13.

The inner contact 18 is retained in a state where the first contacting portion P1 set at the hook portion 18E of the flat plate portion 18A is receiving a force F1 acting in the +X direction and the +Z direction from the receiving portion 13F of the plug contact 13, the second contacting portion P2 set at the protruding portion 18F of the flat plate portion 18A is receiving a force F2 acting in the −X direction from the inner surface of the small diameter portion 13D of the plug contact 13, the third contacting portion P3 set at the protruding portion 18G of the arm portion 18C is receiving a force F3 acting in the −Z direction from the bottom surface of the sheet type conductive member 15, and the restricted portion P4 set at the second extending portion 18D is receiving a force F4 acting in the +X direction from the restriction portion 17H of the bottom insulator 17.

Thus, the first and second contacting portions P1 and P2 are pressed against and make contact with the inner surface of the recessed portion 13E of the plug contact 13, whereby the inner contact 18 is electrically connected to the plug contact 13.

In addition, the top surface on the +Z direction side of the sheet type conductive member 15 is pressed against the bottom surface of the flange 13B of the plug contact 13, while the bottom surface on the −Z direction side of the sheet type conductive member 15 is pressed against the third contacting portion P3 of the inner contact 18.

Here, as shown in FIGS. 11 and 12, on the top surface of the sheet type conductive member 15, the wiring layer 15B is exposed at parts separately adjacent to the opening portions 15A on the −X direction side of the opening portions 15A, and on the bottom surface of the sheet type conductive member 15, the wiring layer 15D is exposed at separately adjacent to the opening portions 15A on the −X direction side of the opening portions 15A.

Therefore, the wiring layer 15B on the top surface of the sheet type conductive member 15 makes contact with the bottom surface of the flange 13B of the plug contact 13 with predetermined contact pressure, while the wiring layer 15D on the bottom surface of the sheet type conductive member 15 makes contact with the third contacting portion P3 of the inner contact 18 with predetermined contact pressure.

Therefore, the wiring layer 15B exposed on the top surface of the sheet type conductive member 15 is electrically connected to the plug contact 13 directly, and the wiring layer 15D exposed on the bottom surface of the sheet type conductive member 15 is electrically connected to the plug contact 13 via the inner contact 18. In other words, both the wiring layers 15B and 15D are connected to the plug contact 13.

Thus, in the connector 11, both the wiring layer 15B and the wiring layer 15D formed of the conductors disposed on the top surface side and the bottom surface side of the sheet type conductive member 15 can be electrically connected to a single plug contact 13 by use of the inner contact 18.

Therefore, when the connector 11 is connected to a sheet type conductive member having a conductor exposed only on its top surface side, the plug contact 13 can be electrically connected to the conductor on the top surface side of the sheet type conductive member. On the other hand, when the connector 11 is connected to a sheet type conductive member having a conductor exposed only on its bottom surface side, the plug contact 13 can be electrically connected to the conductor on the bottom surface side of the sheet type conductive member.

Further, when the connector 11 is connected to a sheet type conductive member having conductors separately exposed on its top surface side and bottom surface side like the sheet type conductive member 15 in Embodiment 1 above, the plug contact 13 can be electrically connected to both the conductors on the top surface side and the bottom surface side of the sheet type conductive member. For example, assuming that a connection object is a sheet type conductive member having a multilayer structure in which conductors constituting shield layers are separately exposed on the top surface side and the bottom surface side and a conductor constituting a signal wiring layer is disposed between these shield layers so as to be insulated from both the shield layers, a shield effect is exhibited to the signal wiring layer when the plug contact 13 connected to the shield layers on the top surface side and the bottom surface side is connected to a ground potential, and it is possible to carry out highly accurate signal transmission with reduced influence of external disturbances caused by, for example, electromagnetic waves.

Note that the flange 13B of each of the plug contacts 13 is sandwiched between the top insulator 16 and the bottom insulator 17, and the plug contacts 13 are thereby fixed to the top insulator 16 and the bottom insulator 17.

In addition, the inner contact 18 is retained while receiving the forces F1 to F4, and if a frictional force is ignored, the force F1 applied to the first contacting portion P1, the force F2 applied to the second contacting portion P2, the force F3 applied to the third contacting portion P3, and the force F4 applied to the restricted portion P4 balance with one another.

That is, when an X directional component force and a Z directional component force of the force F1 are F1X and F1Z, respectively, the following relations are established:

$$F2 = F1X + F4, \quad (1)$$

and $$F3 = F1Z. \quad (2)$$

Note that F1, F2, F3, F4, F1X, and F1Z are expressed in their absolute values.

For example, from balance of the moments about the first contacting portion P1, when a distance in the X direction between the first contacting portion P1 and the third contacting portion P3 is LX, a distance in the Z direction between the first contacting portion P1 and the second contacting portion P2 is LZ1, and a distance in the Z direction between the first contacting portion P1 and the restricted portion P4 is LZ2, the following relation is established:

$$(F2 \times LZ1) = (F3 \times LX) + (F4 \times LX2). \quad (3)$$

As can be seen from Formula (3) above, since the force F4 is applied to the restricted portion P4, the distance LX in the X direction between the first contacting portion P1 and the third contacting portion P3 can be decreased. If the restricted portion P4 of the inner contact 18 does not contact the restriction portion 17H of the projection 17C of the bottom insulator 17 and does not receive the force F4 acting in the +X direction from the restriction portion 17H, in order to retain the inner contact 18 with the balanced moments, it is necessary to increase the distance LX in the X direction between the first contacting portion P1 and the third contacting portion P3 to increase the clockwise moments in FIG. 22. That is, the length of the arm portion 18C extending in the X direction would need to be made larger, resulting in enlargement of the connector 11.

According to Embodiment 1, even when the wiring layer 15B or 15D is exposed on either of the top surface and the bottom surface of the sheet type conductive member 15, the plug contact 13 can be electrically connected to the wiring layer 15B or 15D of the sheet type conductive member 15, and the small-sized connector 11 can be achieved.

Embodiment 2

Figure 23:
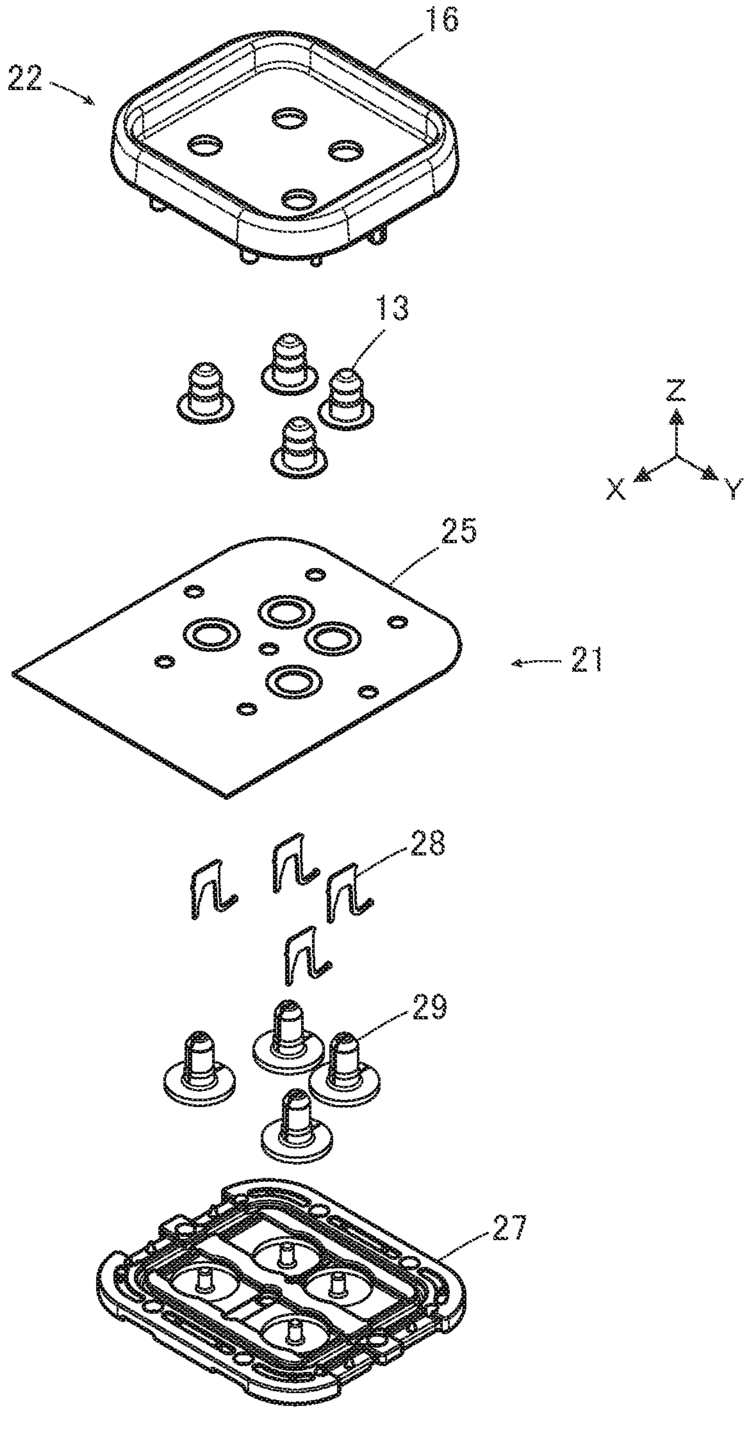
FIG. 23 is an exploded perspective view of a connector according to Embodiment 2.

FIG. 23 shows an exploded perspective view of a connector 21 according to Embodiment 2. The connector 21 includes a housing 22 constituted of the top insulator 16 and a bottom insulator 27.

The four plug contacts 13 are disposed on the −Z direction side of the top insulator 16, and a sheet type conductive member 25 is disposed on the −Z direction side of the four plug contacts 13. Further, four inner contacts 28 are disposed on the −Z direction side of the sheet type conductive member 25, four boss members 29 are disposed on the −Z direction side of the four inner contacts 28, and the bottom insulator 27 is disposed on the −Z direction side of the four boss members 29.

The top insulator 16 and the four plug contacts 13 are the same as those used in the connector 11 of Embodiment 1.

In addition, the four inner contacts 28 and the four boss members 29 correspond to the four plug contacts 13.

Figure 24:
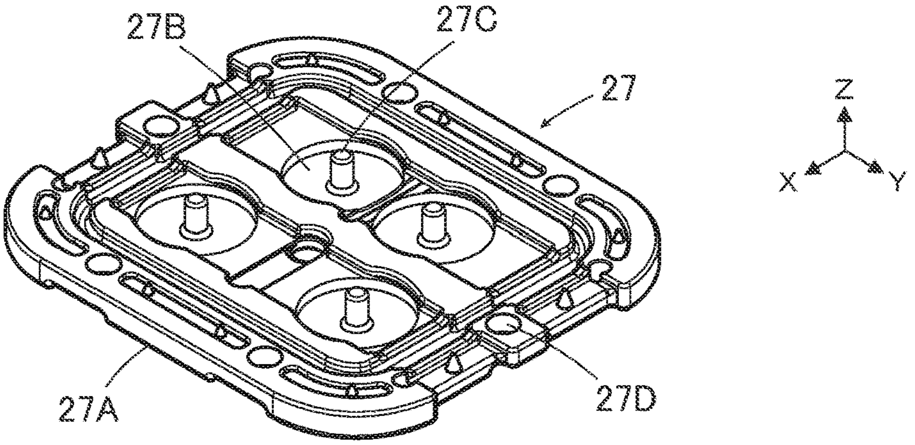
FIG. 24 is a perspective view showing a bottom insulator used in the connector of Embodiment 2.

As shown in FIG. 24, the bottom insulator 27 includes a flat plate portion 27A, and four contact arrangement regions 27B are defined on a top surface, facing in the +Z direction, of the flat plate portion 27A. Each contact arrangement region 27B is a circular region at which the corresponding plug contact 13 is arranged via the sheet type conductive member 25. The four contact arrangement regions 27B are separately provided with four protrusion portions 27C projecting in the +Z direction from respective center parts of the contact arrangement regions 27B.

In addition, the flat plate portion 27A is provided with a plurality of through-holes 27D separately corresponding to the plurality of bosses 16C of the top insulator 16.

Figure 25:
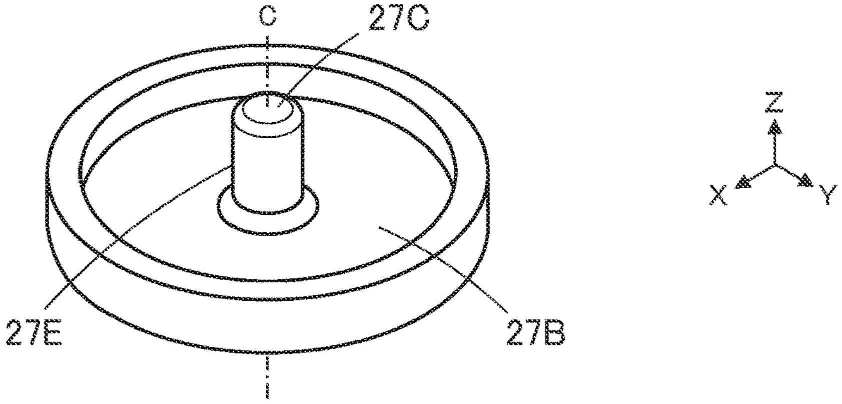
FIG. 25 is an enlarged view of a main part of FIG. 24.

As shown in FIG. 25, the contact arrangement region 27B of the bottom insulator 27 has a recessed and circular shape, and the protrusion portion 27C has a columnar shape extending in the Z direction along the fitting axis C of the plug contact 13 disposed correspondingly to the contact arrangement region 27B. A lateral surface along an outer periphery of the protrusion portion 27C forms a restriction portion 27E.

Figure 26:
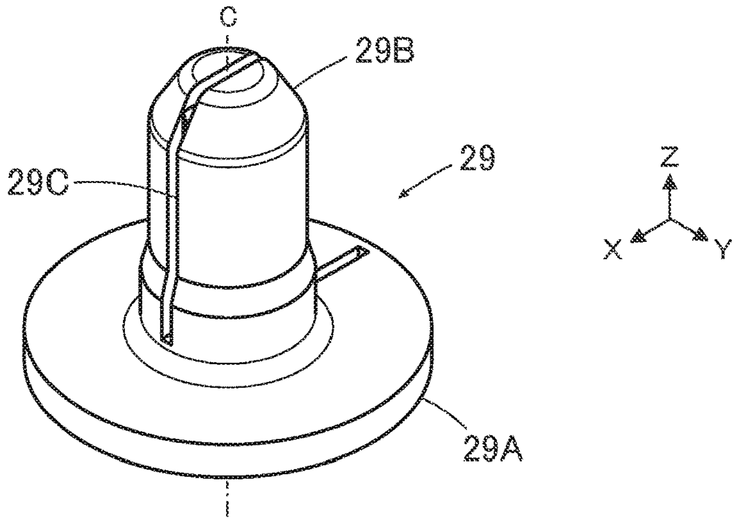
FIG. 26 is a perspective view of a boss member used in the connector of Embodiment 2, as viewed from an obliquely upper position.
Figure 27:
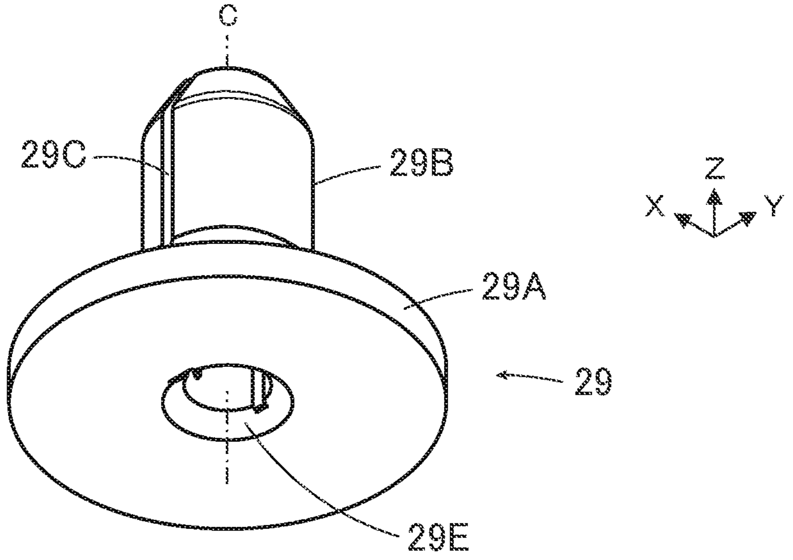
FIG. 27 is a perspective view of the boss member used in the connector of Embodiment 2, as viewed from an obliquely lower position.
Figure 28:
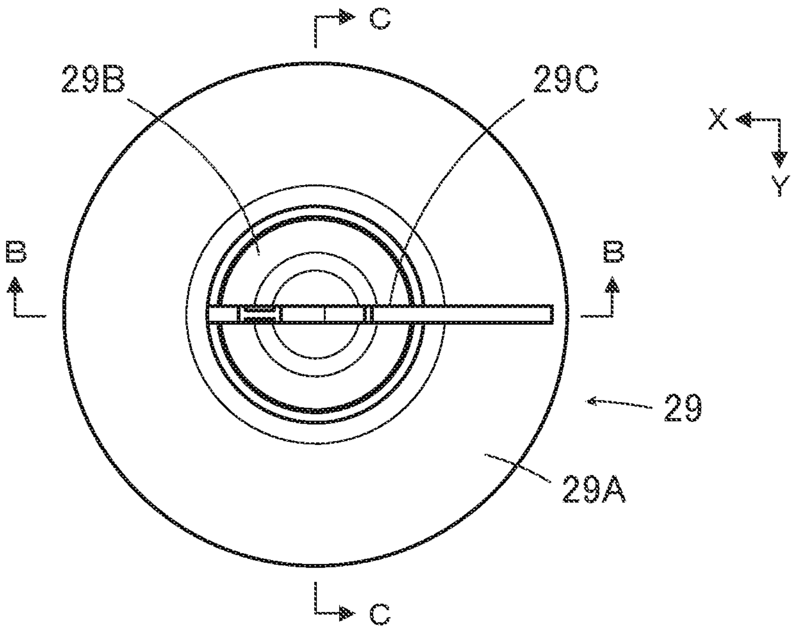
FIG. 28 is a plan view showing the boss member used in the connector of Embodiment 2.

As shown in FIGS. 26 to 28, the boss member 29 includes a base portion 29A of circular disk shape and a projection 29B projecting in the +Z direction from a center part of the base portion 29A, and an inner contact accommodating groove 29C is formed in the projection 29B and the base portion 29A on the −X direction side of the projection 29B. In addition, the base portion 29A has such a size as to be accommodated in the contact arrangement region 27B of recess shape of the bottom insulator 27.

Figure 29:
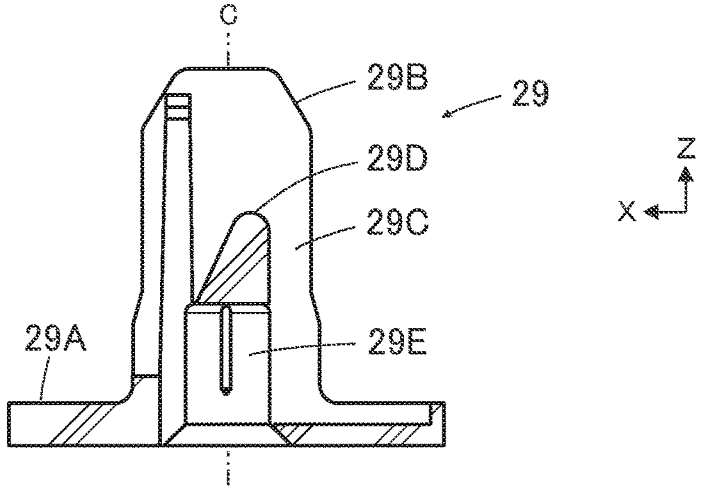
FIG. 29 is a cross-sectional view taken along line B-B in FIG. 28.

The inner contact accommodating groove 29C is configured to accommodate the corresponding inner contact 28, passes the fitting axis C and extends along an XZ plane. The inner contact accommodating groove 29C penetrates a +Z directional portion of the projection 29B in the X direction and extends from a root part of the projection 29B to the base portion 29A as shown in FIG. 29. The inner contact accommodating groove 29C has a Y directional groove width slightly larger than the thickness of the inner contact 28.

In addition, the projection 29B includes an abutment portion 29D disposed inside the inner contact accommodating groove 29C and facing in the +Z direction.

Figure 30:
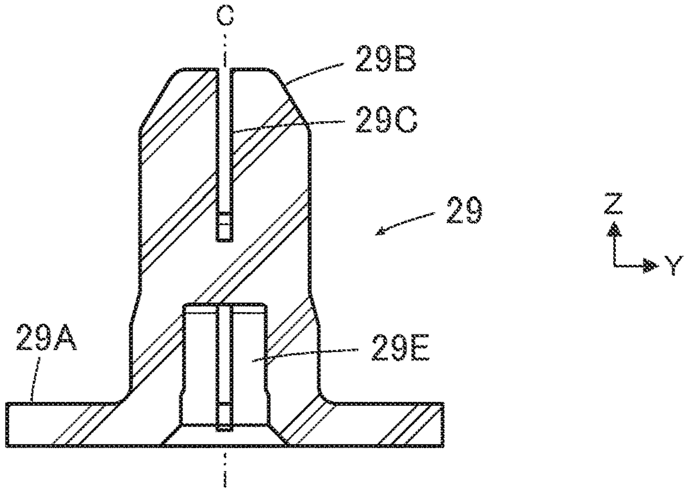
FIG. 30 is a cross-sectional view taken along line C-C in FIG. 28.

In addition, as shown in FIGS. 29 and 30, the boss member 29 includes a protrusion portion accommodating hole 29E extending from a bottom surface on the −Z direction side of the base portion 29A along the fitting axis C to the inside of the projection 29B and communicating with the inner contact accommodating groove 29C. The protrusion portion accommodating hole 29E opens in the −Z direction from the bottom surface on the −Z direction side of the base portion 29A and is configured to accommodate the protrusion portion 27C of the bottom insulator 27 when the connector 21 is assembled.

The sheet type conductive member 25 has a multilayer structure in which a plurality of wiring layers each formed from a conductor and a plurality of insulating layers are laminated.

Figure 31:
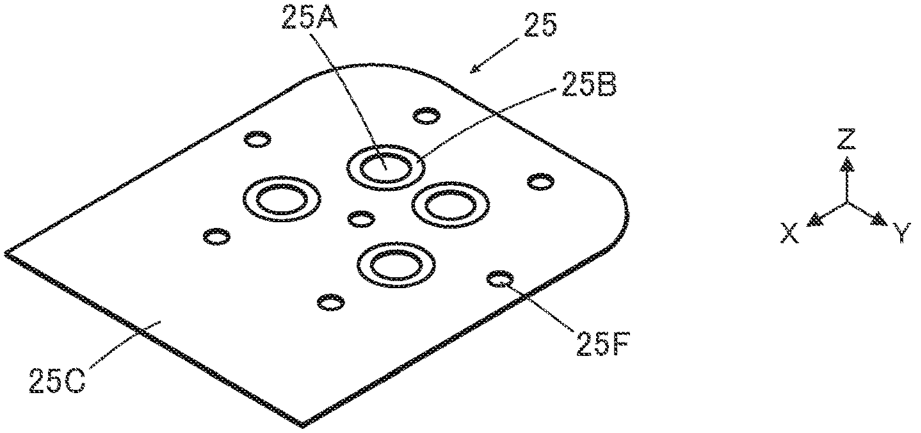
FIG. 31 is a perspective view of a connection object to be connected to the connector of Embodiment 2, as viewed from an obliquely upper position.

As shown in FIG. 31, the sheet type conductive member 25 is provided with four circular opening portions 25A penetrating the sheet type conductive member 25 in the Z direction. The four opening portions 25A separately correspond to the four plug contacts 13. On a top surface, facing in the +Z direction, of the sheet type conductive member 25, a wiring layer 25B is exposed toward the +Z direction and around each of the opening portions 25A so as to surround the opening portions 25A, while an insulating layer 25C is exposed in a region excluding the four opening portions 25A and the four parts of the wiring layer 25B disposed around these opening portions 25A.

Figure 32:
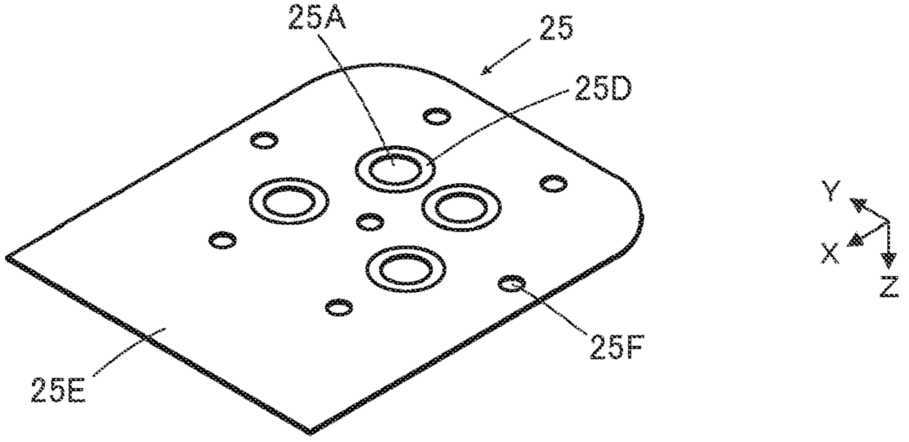
FIG. 32 is a perspective view of the connection object to be connected to the connector of Embodiment 2, as viewed from an obliquely lower position.

Since the opening portions 25A penetrate the sheet type conductive member 25 in the Z direction, as shown in FIG. 32, the four opening portions 25A can be seen also on a bottom surface, facing in the −Z direction, of the sheet type conductive member 25.

On the bottom surface, facing in the −Z direction, of the sheet type conductive member 25, a wiring layer 25D is exposed toward the −Z direction and around the four opening portions 25A so as to surround the opening portions 25A, while an insulating layer 25E is exposed in a region excluding the four opening portions 25A and the four parts of the wiring layer 25D disposed around these opening portions 25A.

In addition, as shown in FIGS. 31 and 32, a plurality of through-holes 25F separately corresponding to the plurality of bosses 16C of the top insulator 16 are formed at a peripheral portion of the sheet type conductive member 25.

Figure 33:
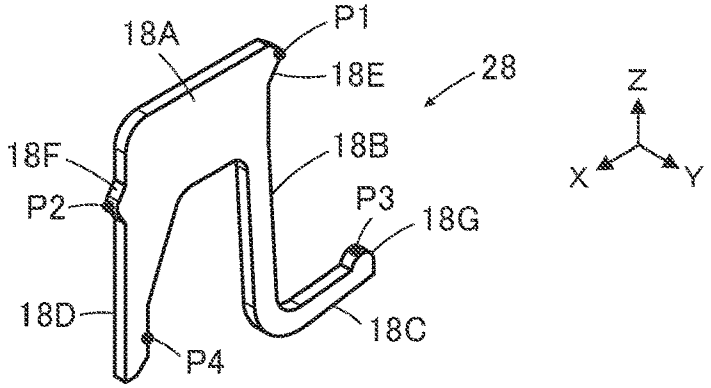
FIG. 33 is a perspective view showing an inner contact used in the connector of Embodiment 2.
Figure 34:
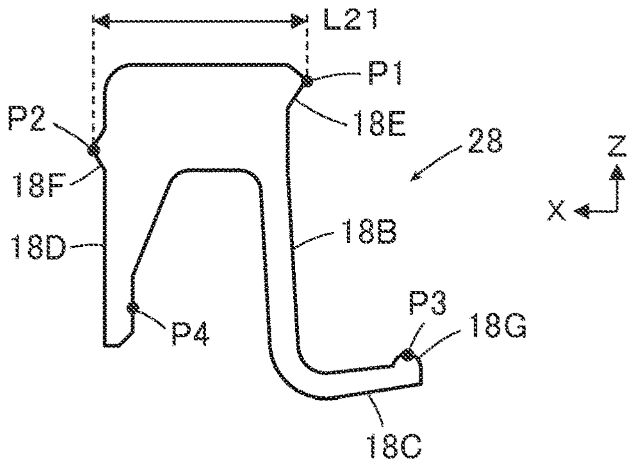
FIG. 34 is a front view showing the inner contact used in the connector of Embodiment 2.

FIGS. 33 and 34 show the inner contact 28. The inner contact 28 does not have the press-fitting portion 18H formed on the surface of the flat plate portion 18A in the inner contact 18 used in Embodiment 1, and the configuration of the inner contact 28 is the same as that of the inner contact 18 expect the press-fitting portion 18H.

More specifically, the inner contact 28 is formed from a metal sheet of flat plate shape that is cut in a predetermined shape and has conductivity, and includes the flat plate portion 18A extending along an XZ plane, the first extending portion 18B extending in the −Z direction from the −X directional end portion of the flat plate portion 18A, the arm portion 18C extending in the −X direction from the −Z directional end portion of the first extending portion 18B, and the second extending portion 18D extending in the −Z direction from the +X directional end portion of the flat plate portion 18A.

The hook portion 18E projecting in the −X direction is formed at the −X directional and +Z directional end portion of the flat plate portion 18A, and the first contacting portion P1 facing in the −Z direction is set at the −X directional end portion of the hook portion 18E.

In addition, the protruding portion 18F protruding in the +X direction is formed at a +X directional end portion of the flat plate portion 18A on the −Z direction side from the first contacting portion P1, and the second contacting portion P2 facing in the +X direction is set at the +X directional end portion of the protruding portion 18F.

The distance L21 in the X direction between the first contacting portion P1 and the second contacting portion P2 is slightly larger than the distance L11 in the X direction from the receiving portion 13D to a part of the inner surface of the small diameter portion 13D which part faces the receiving portion 13D, is smaller than the inside diameter L12 of the large diameter portion 13C, and is larger than the inside diameter L13 of the small diameter portion 13D in the plug contact 13 shown in FIG. 10.

In addition, the protruding portion 18G protruding in the +Z direction is formed at the −X directional end portion of the arm portion 18C, and the third contacting portion P3 facing in the +Z direction is set at a +Z directional end portion of the protruding portion 18G.

The restricted portion P4 facing in the −X direction is set on a part of the lateral surface of a −Z directional end portion of the second extending portion 18D which part faces the first extending portion 18B.

The four contact through-holes 16B of the top insulator 16, the four plug contacts 13, the four opening portions 25A of the sheet type conductive member 25, the four inner contacts 28, the four boss members 29, and the four contact arrangement regions 27B of the bottom insulator 27 are arranged so as to align with each other in the Z direction.

In addition, the bosses 16C of the top insulator 16, the through-holes 25F of the sheet type conductive member 25, and the through-holes 27D of the bottom insulator 27 are arranged so as to align with each other in the Z direction.

Figure 35:
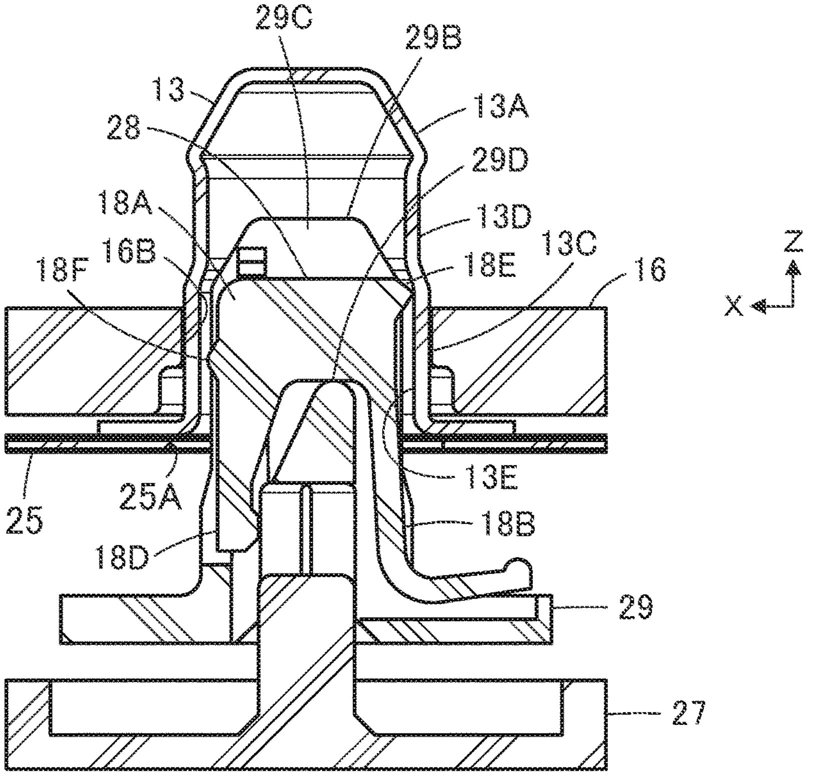
FIG. 35 is a cross-sectional view showing the connector of Embodiment 2 at the start of assembling.

When the connector 21 is assembled, first, the four inner contacts 28 are separately retained by the inner contact accommodating grooves 29C of the projections 29B of the four boss members 29. The inner contact accommodating groove 29C has a Y directional groove width slightly larger than the thickness of the inner contact 28, the inner contact 28 is inserted into the inner contact accommodating groove 29C from the +Z direction, and as shown in FIG. 35, the inner contact 28 is retained in a state where a −Z directional end portion of the flat plate portion 18A between the first extending portion 18B and the second extending portion 18D is making contact with the abutment portion 29D within the inner contact accommodating groove 29C.

Subsequently, the tubular portion 13A of each plug contact 13 is inserted into the corresponding one of the four contact through-holes 16B of the top insulator 16 from the −Z direction, and each of the four boss members 29 is pressed toward the top insulator 16 in the +Z direction with the sheet type conductive member 25 being sandwiched therebetween.

At this time, the inner contact 28 retained by the inner contact accommodating groove 29C of the projection 29B of the boss member 29 is, together with the boss member 29, pushed up in the +Z direction, and the flat plate portion 18A of the inner contact 28 is inserted into the recessed portion 13E of the corresponding plug contact 13 through the opening portion 25A of the sheet type conductive member 25.

Here, the distance L21 in the X direction between the −X directional end portion of the hook portion 18E and the +X directional end portion of the protruding portion 18F of the inner contact 28 shown in FIG. 34 is smaller than the inside diameter L12 of the large diameter portion 13C and larger than the inside diameter L13 of the small diameter portion 13D of the plug contact 13. Therefore, while the flat plate portion 18A of the inner contact 28 can move in the +Z direction within the large diameter portion 13C of the plug contact 13, the protruding portion 18F situated on the −Z direction side from the hook portion 18E cannot enter the small diameter portion 13D and is hooked by the step portion 13G situated at the boundary portion between the large diameter portion 13C and the small diameter portion 13D as shown in FIG. 36.

Figure 36:
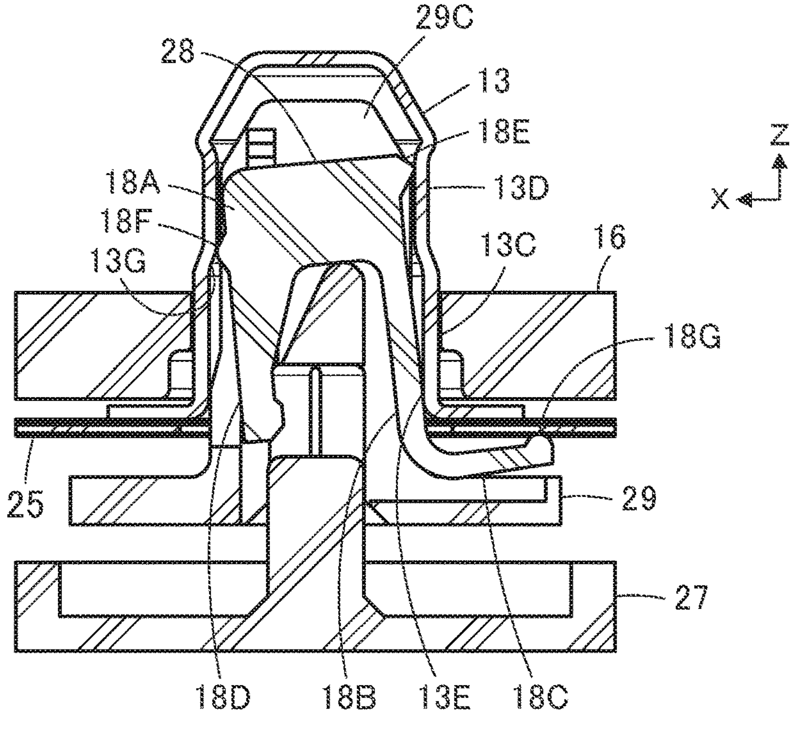
FIG. 36 is a cross-sectional view showing the connector of Embodiment 2 in the process of assembling.

As a result, the inner contact 28 takes a position rotated counterclockwise by a predetermined angle in FIG. 36 and moves in the +Z direction within the recessed portion 13E of the plug contact 13.

Accordingly, the first extending portion 18B and the second extending portion 18D of the inner contact 28 are also inserted into the recessed portion 13E of the plug contact 13, and further, the protruding portion 18G formed at the −X directional end portion of the arm portion 18C extending in the −X direction from the −Z directional end of the first extending portion 18B makes contact with the bottom surface on the −Z direction side of the sheet type conductive member 25.

Figure 37:
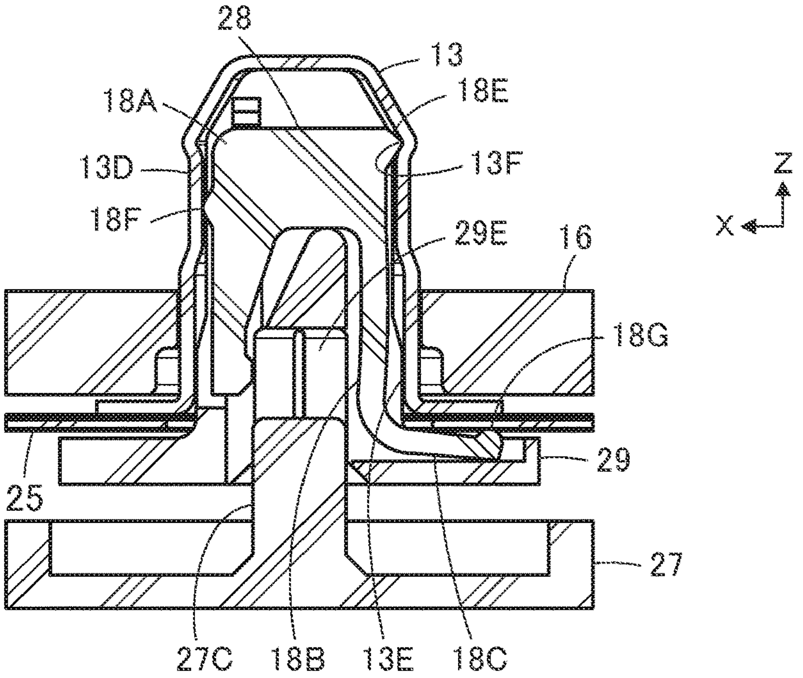
FIG. 37 is another cross-sectional view showing the connector of Embodiment 2 in the process of assembling.

When the boss member 29 is further pressed in the +Z direction in this state, the flat plate portion 18A moves in the +Z direction while the first extending portion 18B and the arm portion 18C of the inner contact 28 are elastically deformed, and as shown in FIG. 37, the hook portion 18E is received by the receiving portion 13F formed at the recessed portion 13E of the plug contact 13.

Consequently, the inner contact 28 is rotated clockwise in FIG. 37 and retained by the plug contact 13 in a state where the protruding portion 18G of the arm portion 18C is pressed in the −Z direction from the sheet type conductive member 25 and elastically deformed, and the protruding portion 18F of the flat plate portion 18A is pressed in the −X direction from the inner surface of the small diameter portion 13D of the plug contact 13.

Here, by pressing the bottom insulator 27 toward the top insulator 16, each of the four protrusion portions 27C of the bottom insulator 27 is inserted into the protrusion portion accommodating hole 29E of the corresponding boss member 29 from the −Z direction.

In addition, by pressing the bottom insulator 27 against the top insulator 16, the bosses 16C of the top insulator 16 sequentially penetrate the through-holes 25F of the sheet type conductive member 25, and the through-holes 27D of the bottom insulator 27. Thereafter, the top insulator 16 and the bottom insulator 27 are fixed to each other through heat deformation of a tip of each of the plurality of bosses 16C projecting on the −Z direction side of the bottom insulator 27. Thus, the assembling operation of the connector 21 is completed.

Figure 38:
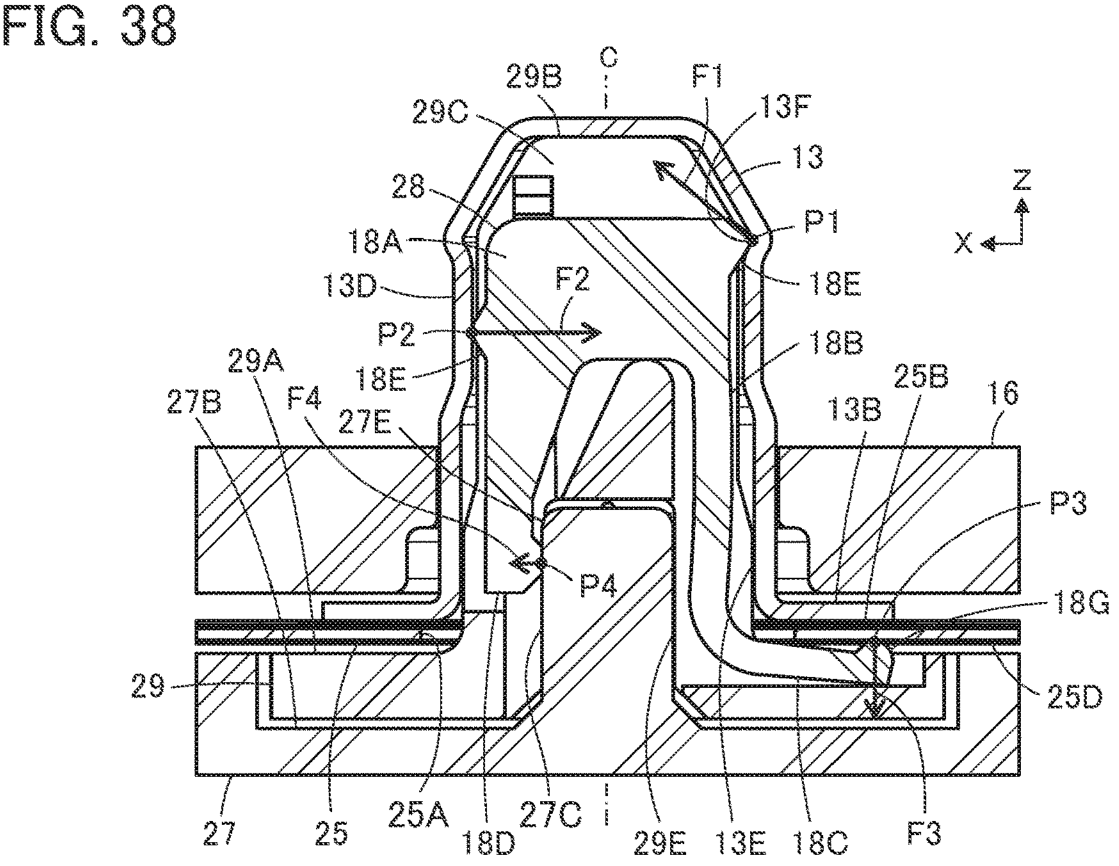
FIG. 38 is a cross-sectional view showing the connector of Embodiment 2 connected to the connection object.
Figure 39:
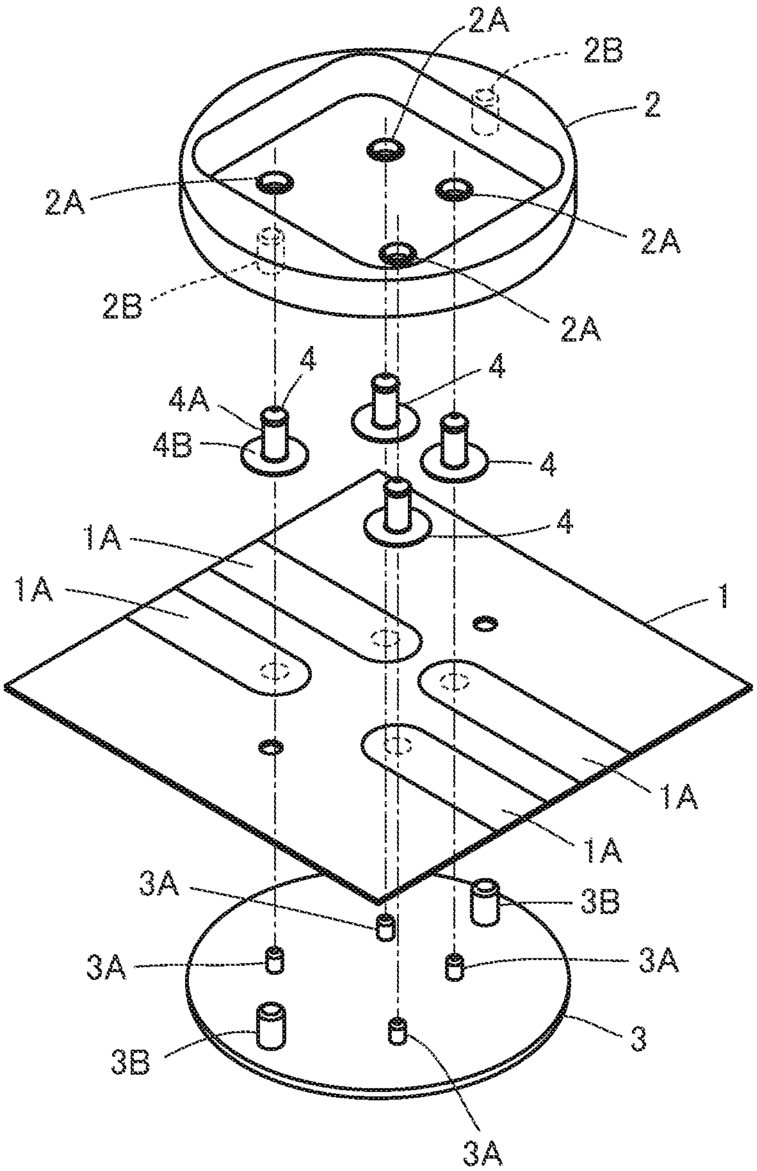
FIG. 39 PRIOR ART
FIG. 39 is an exploded perspective view of a conventional connector.
Figure 40:
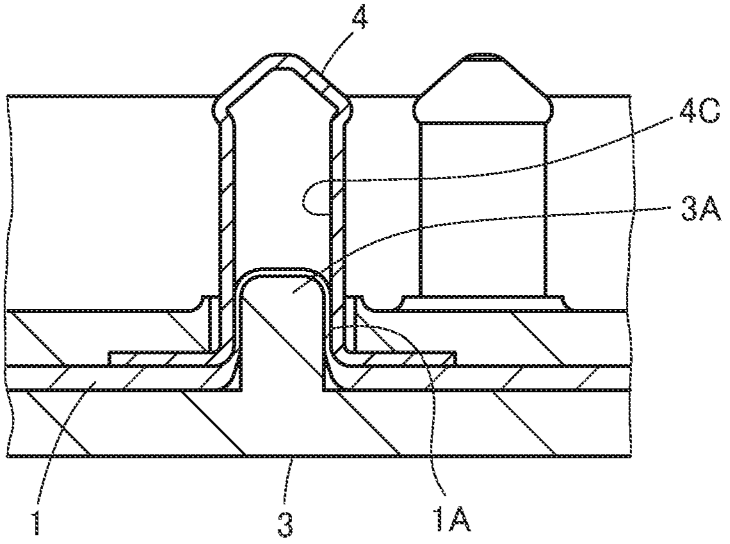
FIG. 40 PRIOR ART
FIG. 40 is a partial cross-sectional view showing the conventional connector.

In the connector 21 assembled as above, as shown in FIG. 38, the base portion 29A of the boss member 29 is accommodated in the contact arrangement region 27B of recess shape of the bottom insulator 27, the restriction portion 27E constituted of the lateral surface of the protrusion portion 27C of the bottom insulator 27 inserted in the protrusion portion accommodating hole 29E of the boss member 29 makes contact with the restricted portion P4 set at the −Z directional end portion of the second extending portion 18D of the inner contact 28 inserted in the inner contact accommodating groove 29C communicating with the protrusion portion accommodating hole 29E.

Therefore, counterclockwise rotation of the inner contact 28 in FIG. 38 is restricted.

In addition, the flange 13B of the plug contact 13 is situated around the corresponding opening portion 25A of the sheet type conductive member 25, and the sheet type conductive member 25 is sandwiched between the protruding portion 18G formed at the −X directional end portion of the arm portion 18C of the inner contact 28 and the bottom surface on the −Z direction side of the flange 13B of the plug contact 13.

The inner contact 28 is retained in a state where the first contacting portion P1 set at the hook portion 18E of the flat plate portion 18A is receiving the force F1 acting in the +X direction and the +Z direction from the receiving portion 13F of the plug contact 13, the second contacting portion P2 set at the protruding portion 18F of the flat plate portion 18A is receiving the force F2 acting in the −X direction from the inner surface of the small diameter portion 13D of the plug contact 13, the third contacting portion P3 set at the protruding portion 18G of the arm portion 18C is receiving the force F3 acting in the −Z direction from the bottom surface of the sheet type conductive member 25 and is elastically displaced, and the restricted portion P4 set at the second extending portion 18D is receiving the force F4 acting in the +X direction from the restriction portion 27E of the protrusion portion 27C of the bottom insulator 27.

Thus, the first and second contacting portions P1 and P2 are pressed against and make contact with the inner surface of the recessed portion 13E of the plug contact 13, whereby the inner contact 28 is electrically connected to the plug contact 13.

In addition, the top surface on the +Z direction side of the sheet type conductive member 25 is pressed against the bottom surface of the flange 13B of the plug contact 13, while the bottom surface on the −Z direction side of the sheet type conductive member 25 is pressed against the third contacting portion P3 of the inner contact 28.

Here, as shown in FIGS. 31 and 32, on the top surface of the sheet type conductive member 25, the wiring layer 25B is exposed around the opening portions 25A, and on the bottom surface of the sheet type conductive member 25, the wiring layer 25D is exposed around the opening portions 25A.

Therefore, the wiring layer 25B on the top surface of the sheet type conductive member 25 makes contact with the bottom surface of the flange 13B of the plug contact 13 with predetermined contact pressure, while the wiring layer 25D on the bottom surface of the sheet type conductive member 25 makes contact with the third contacting portion P3 of the inner contact 28 with predetermined contact pressure.

Therefore, the wiring layer 25B exposed on the top surface of the sheet type conductive member 25 is electrically connected to the plug contact 13 directly, and the wiring layer 25D exposed on the bottom surface of the sheet type conductive member 25 is electrically connected to the plug contact 13 via the inner contact 28. In other words, both the wiring layers 25B and 25D are connected to the plug contact 13.

Thus, in the connector 21, as with the connector 11 of Embodiment 1, both the wiring layer 25B and the wiring layer 25D respectively formed of the conductor disposed on the top surface side and the conductor disposed on the bottom surface side of the sheet type conductive member 25 can be electrically connected to the single plug contact 13.

Therefore, when the connector 21 is connected to a sheet type conductive member having a conductor exposed only on its top surface side, the plug contact 13 can be electrically connected to the conductor on the top surface side of the sheet type conductive member. On the other hand, when the connector 21 is connected to a sheet type conductive member having a conductor exposed only on its bottom surface side, the plug contact 13 can be electrically connected to the conductor on the bottom surface side of the sheet type conductive member.

In addition, as with the connector 11 of Embodiment 1, the force F4 is applied from the restriction portion 27E of the protrusion portion 27C of the bottom insulator 27 to the restricted portion P4 of the inner contact 28, whereby the small-sized connector 21 can be achieved.

The tubular portion 13A of the plug contact 13 has a cylindrical shape extending along the fitting axis C, the projection 29B of the boss member 29 is formed to project on the center part of the base portion 29A of circular disk shape, the protrusion portion 27C of the bottom insulator 27 is formed to project on the center part of the contact arrangement region 27B of circular shape, and the wiring layers 25B, 25D of the sheet type conductive member 25 are respectively exposed on the top surface and the bottom surface of the sheet type conductive member 25 so as to surround the opening portions 25A.

Therefore, when the boss member 29 in which the inner contact 28 is retained by the projection 29B is pressed in the +Z direction toward the top insulator 16, even with the inner contact 28 facing in either of the rotational directions about the fitting axis C, the flat plate portion 18A, the first extending portion 18B, and the second extending portion 18D of the inner contact 28 are inserted into the recessed portion 13E of the plug contact 13, and further, the protrusion portion 27C of the bottom insulator 27 is inserted into the protrusion portion accommodating hole 29E of the boss member 29, so that the wiring layers 25B, 25D of the sheet type conducive member 25 can be electrically connected to the plug contact 13. Of the lateral surface along the outer periphery of the protrusion portion 27C of the bottom insulator 27, a part facing the restricted portion P4 of the inner contact 28 serves as the restriction portion 27E and applies the force F4 to the restricted portion P4.

While the plug contact 13 is connected to both the wiring layer 15B, 25B and the wiring layer 15D, 25D respectively exposed on the top surface side and the bottom surface side of the sheet type conductive member 15, 25 in Embodiments 1 and 2 above, only the wiring layer 15D, 25D exposed on the bottom surface side of the sheet type conductive member 15 may be connected to the plug contact 13, for instance.

While the sheet type conductive member 15, 25 used in Embodiments 1 and 2 above has a multilayer structure, the invention is not limited thereto, and it suffices if the sheet type conductive member has a conductor exposed on at least one surface thereof.

In addition, while the two layers of the conductors, i.e., the wiring layer 15B, 25B and the wiring layer 15D, 25D of the sheet type conductive member 15, 25 are connected to the single plug contact 13 in Embodiments 1 and 2 above, the invention is not limited thereto, and three or more layers of conductors may be connected to the single plug contact 13.

In addition, while the connector 11, 21 according to Embodiments 1 and 2 above has the four plug contacts 13, the invention is not limited to this number of the plug contacts 13, and it suffices if the connector includes at least a single plug contact 13 to be electrically connected to a conductor exposed on at least one surface of the sheet type conductive member 15, 25.

What is claimed is:

1. A connector comprising:

a plug contact having conductivity and including a tubular portion and a flange, the tubular portion extending along a fitting axis and being provided in its interior with a recessed portion, and the flange extending from a base end of the tubular portion in a direction orthogonal to the fitting axis;

an inner contact having conductivity and being supported while having part of the inner contact inserted in the recessed portion; and a housing retaining the plug contact, wherein the housing includes a restriction portion that is disposed in the recessed portion of the plug contact and is configured to restrict rotation of the inner contact, the inner contact includes a first contacting portion that makes contact with an inner surface of the recessed portion to be electrically connected to the plug contact, a second contacting portion that makes contact with the inner surface of the recessed portion on an opposite side from the first contacting portion across the fitting axis and at a position closer to the base end of the recessed portion than the first contacting portion is, a third contacting portion extending in a direction orthogonal to the fitting axis and facing the flange, and a restricted portion that faces in an opposite direction from the second contacting portion and makes contact with the restriction portion at a position closer to the base end of the recessed portion than the second contacting portion is, and part of a connection object of sheet shape having a conductor exposed on at least one surface of the connection object is sandwiched between a bottom surface of the flange of the plug contact and the third contacting portion of the inner contact in a direction along the fitting axis, the bottom surface of the flange makes contact with a top surface of the connection object, and the third contacting portion makes contact with a bottom surface of the connection object, whereby the plug contact is electrically connected to the conductor directly when the conductor is exposed on the top surface of the connection object, and the plug contact is electrically connected to the conductor via the inner contact when the conductor is exposed on the bottom surface of the connection object.

2. The connector according to claim 1, wherein the inner contact includes:

a flat plate portion extending both in an axial direction along the fitting axis and an orthogonal direction orthogonal to the fitting axis across an inside of the recessed portion, a first extending portion extending along the fitting axis from one end of the flat plate portion in the orthogonal direction toward the base end of the recessed portion;

an arm portion extending from a tip of the first extending portion in the orthogonal direction; and a second extending portion extending along the fitting axis from another end of the flat plate portion in the orthogonal direction toward the base end of the recessed portion, the first contacting portion is disposed at the one end of the flat plate portion in the orthogonal direction, the second contacting portion is disposed at the another end of the flat plate portion in the orthogonal direction, the third contacting portion is disposed at a tip of the arm portion, and the restricted portion is disposed on a lateral surface of the second extending portion, the lateral surface facing the first extending portion.

3. The connector according to claim 2, wherein the inner contact includes a hook portion projecting in the orthogonal direction from the one end of the flat plate portion, the first contacting portion being disposed at a tip of the hook portion, and the plug contact includes a receiving portion formed inside the recessed portion and receiving the hook portion.

4. The connector according to claim 1, wherein the third contacting portion makes contact with the bottom surface of the connection object while being elastically displaced.

5. The connector according to claim 1, wherein the housing has a projection extending along the fitting axis and inserted into the recessed portion of the plug contact, the projection has an inner contact accommodating groove in which the inner contact is accommodated, and the restricting portion is disposed inside the inner contact accommodating groove.

6. The connector according to claim 5, wherein the housing has a bottom insulator provided with the projection, and the restriction portion is formed inside the inner contact accommodating groove of the projection.

7. The connector according to claim 6, wherein the inner contact includes a press-fitting portion of convex shape that is formed to protrude from a surface of the flat plate portion in a direction orthogonal to the surface of the flat plate portion, the inner contact accommodating groove includes a first accommodating groove disposed at an opening end portion of the inner contact accommodating groove, and a second accommodating groove disposed deeper in the inner contact accommodating groove than the first accommodating groove and communicating with the first accommodating groove, the first accommodating groove has a first groove width that allows a part of the inner contact, at which part the press-fitting portion is formed, to be inserted into the first accommodating groove, and the second accommodating groove has a second groove width narrower than a thickness dimension of the inner contact at the part at which the press-fitting portion is formed.

8. The connector according to claim 5, wherein the housing includes:

a bottom insulator provided with a boss accommodating portion of recess shape; and a boss member accommodated in the boss accommodating portion and provided with the projection, the bottom insulator includes a protrusion portion protruding from a bottom part of the boss accommodating portion along the fitting axis, the boss member includes a protrusion portion accommodating hole communicating with the inner contact accommodating groove and accommodating the protrusion portion, and the restriction portion is formed by a lateral surface of the protrusion portion.

9. The connector according to claim 8, wherein the projection includes an abutment portion disposed at a bottom part of the inner contact accommodating groove and abutting the inner contact in a direction along the fitting axis.

10. The connector according to claim 1, comprising a top insulator provided with a contact through-hole that is penetrated by the tubular portion of the plug contact and is smaller than the flange.

* * * * *